US010838891B2

(12) United States Patent
Desai et al.

(10) Patent No.: US 10,838,891 B2
(45) Date of Patent: *Nov. 17, 2020

(54) ARBITRATING PORTIONS OF TRANSACTIONS OVER VIRTUAL CHANNELS ASSOCIATED WITH AN INTERCONNECT

(71) Applicant: Provino Technologies, Inc., Santa Clara, CA (US)

(72) Inventors: Shailendra Desai, Ahmedabad (IN); Mark Pearce, San Francisco, CA (US); Amit Jain, Ahmedabad (IN); Rutul Bhatt, Ahmedabad (IN)

(73) Assignee: PROVINO TECHNOLOGIES, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/368,287

(22) Filed: Mar. 28, 2019

(65) Prior Publication Data
US 2019/0303325 A1 Oct. 3, 2019

Related U.S. Application Data

(60) Provisional application No. 62/800,897, filed on Feb. 4, 2019, provisional application No. 62/650,589, filed on Mar. 30, 2018.

(51) Int. Cl.
*G06F 13/20* (2006.01)
*G06F 9/46* (2006.01)
*G06F 9/48* (2006.01)
*G06F 9/54* (2006.01)
*G06F 13/362* (2006.01)
(Continued)

(52) U.S. Cl.
CPC .............. *G06F 13/20* (2013.01); *G06F 9/466* (2013.01); *G06F 9/4881* (2013.01); *G06F 9/542* (2013.01); *G06F 13/366* (2013.01); *G06F 13/3625* (2013.01); *G06F 13/4022* (2013.01); *G06F 15/7807* (2013.01); *G06F 2213/0024* (2013.01); *G06F 2213/0062* (2013.01)

(58) Field of Classification Search
CPC ........ G06F 13/20; G06F 9/466; G06F 9/4881; G06F 9/542; G06F 13/3625; G06F 13/366; G06F 13/4022; G06F 15/7807
USPC ........................ 710/21, 30, 51, 107, 117, 240
See application file for complete search history.

(56) References Cited

U.S. PATENT DOCUMENTS 6,604,159 B1    8/2003  Thekkath et al.
6,678,767 B1 *  1/2004  Cho ..................... G06F 13/423
                                                              710/100

(Continued)

OTHER PUBLICATIONS

Search Report dated Aug. 7, 2019 from International Application No. PCT/US2019/023001.
(Continued)

*Primary Examiner* — Idriss N Alrobaye
*Assistant Examiner* — Henry W Yu
(74) *Attorney, Agent, or Firm* — Beyer Law Group LLP

(57) ABSTRACT

Arbitrating among portions of multiple transactions and transmitting a winning portion over one of a multiplicity of virtual channels associated with an interconnect on a clock cycle-by-clock cycle basis. By repeatedly performing the above each clock cycle, winning portions are interleaved and transmitted over the multiplicity of virtual channels over multiple clock cycles respectively.

48 Claims, 15 Drawing Sheets

(51) Int. Cl.
*G06F 13/366* (2006.01)
*G06F 13/40* (2006.01)
*G06F 15/78* (2006.01)

(56) References Cited

U.S. PATENT DOCUMENTS

| | | | |
|---|---|---|---|
| 6,707,817 B1 | 3/2004 | Kadambi et al. | |
| 6,829,666 B1* | 12/2004 | Deneroff | G06F 15/17381 710/305 |
| 6,976,134 B1 | 12/2005 | Lolayekar et al. | |
| 7,260,688 B1 | 8/2007 | Baxter et al. | |
| 7,664,018 B2* | 2/2010 | Warren | H04L 12/433 370/230 |
| 7,912,075 B1* | 3/2011 | Holland | H04L 65/80 370/216 |
| 9,514,074 B2* | 12/2016 | Jeloka | G11C 7/10 |
| 10,585,825 B2 | 3/2020 | Desai et al. | |
| 2002/0196778 A1* | 12/2002 | Colmant | H04L 49/108 370/352 |
| 2005/0131666 A1* | 6/2005 | Tsai | G06F 30/33 703/17 |
| 2006/0212632 A1 | 9/2006 | Apostol et al. | |
| 2006/0248318 A1* | 11/2006 | Zohner | G06F 9/3853 712/225 |
| 2007/0130344 A1 | 6/2007 | Pepper | |
| 2009/0245257 A1 | 10/2009 | Comparan et al. | |
| 2010/0198972 A1 | 8/2010 | Umbehocker | |
| 2011/0302336 A1* | 12/2011 | Naylor | G06F 13/1626 710/35 |
| 2012/0079155 A1* | 3/2012 | Damodaran | H03M 13/353 710/244 |
| 2012/0163797 A1 | 6/2012 | Wang | |
| 2013/0083794 A1 | 4/2013 | Lakshmanamurthy et al. | |
| 2013/0138858 A1 | 5/2013 | Adler et al. | |
| 2013/0185370 A1 | 7/2013 | Li et al. | |
| 2014/0258578 A1* | 9/2014 | Lakshmanamurthy | G06F 13/362 710/113 |
| 2014/0281724 A1 | 9/2014 | Ki et al. | |
| 2014/0344485 A1* | 11/2014 | Dondini | G06F 13/28 710/22 |
| 2016/0283428 A1 | 9/2016 | Guddeti | |
| 2017/0017412 A1* | 1/2017 | Luan | G06F 3/0613 |
| 2017/0063625 A1* | 3/2017 | Philip | H04L 41/0889 |
| 2019/0227979 A1 | 7/2019 | Ganesh et al. | |

OTHER PUBLICATIONS

Desai et al., U.S. Appl. No. 16/368,358, filed Mar. 28, 2019.
Desai et al., U.S. Appl. No. 16/369,612, filed Mar. 29, 2019.
Desai et al., U.S. Appl. No. 16/369,599, filed Mar. 29, 2019.
Office Action dated Mar. 31, 2020, U.S. Appl. No. 16/368,358.
Office Action dated May 26, 2020, U.S. Appl. No. 16/368,358.
Office Action dated Jun. 12, 2020, U.S. Appl. No. 16/369,599.
Office Action dated Sep. 19, 2019, U.S. Appl. No. 16/369,612.
Notice of Allowance dated Jan. 15, 2020, U.S. Appl. No. 16/369,612.

\* cited by examiner

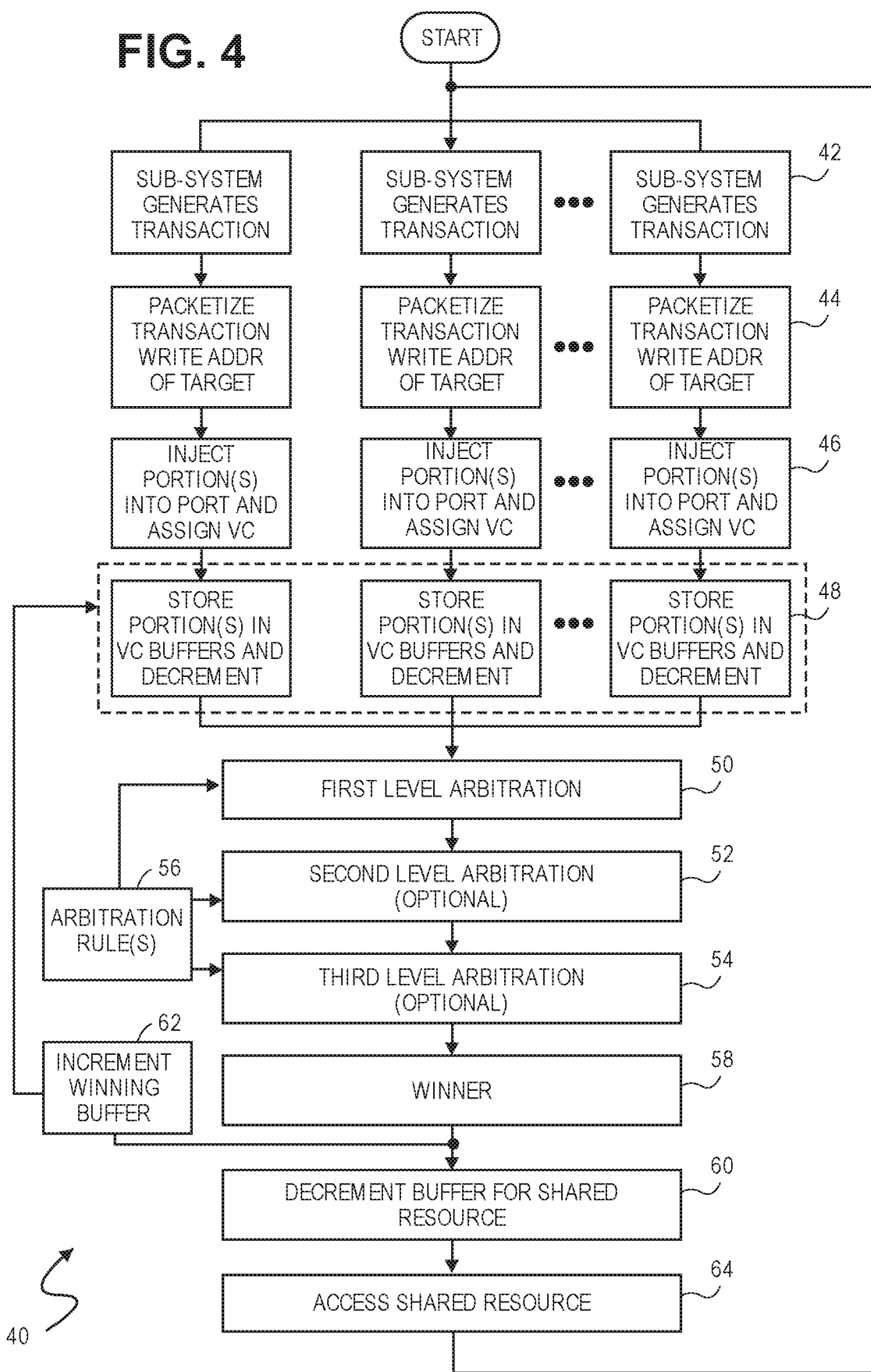

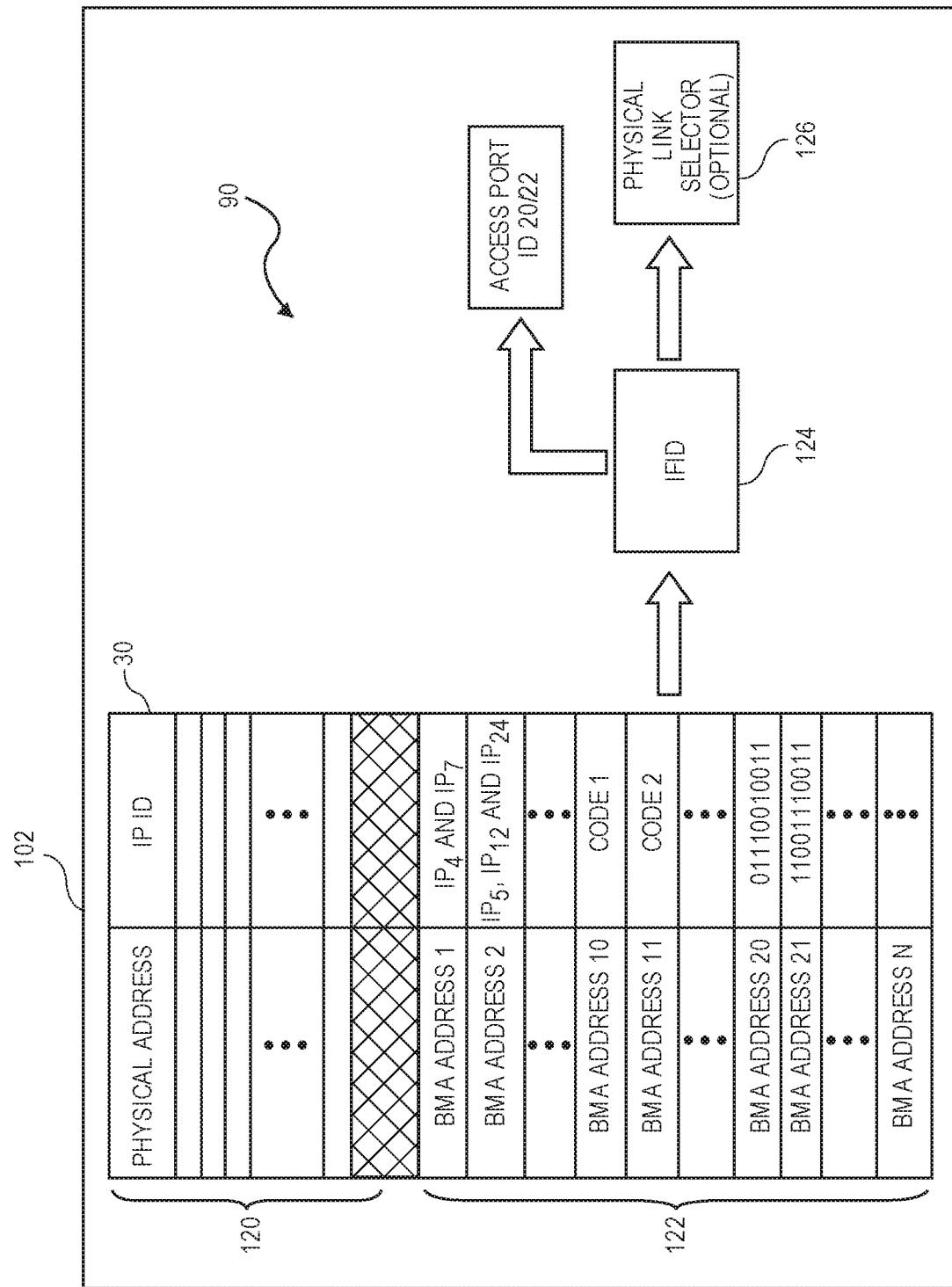

ARBITRATING PORTIONS OF TRANSACTIONS OVER VIRTUAL CHANNELS ASSOCIATED WITH AN INTERCONNECT

CROSS-REFERENCE TO RELATED APPLICATIONS

The present application claim priority of U.S. Provisional Patent Application No. 62/650,589 (PRTIP001P) filed Mar. 30, 2018 and U.S. Provisional Application 62/800,897 (PRTIP003P) filed Feb. 4, 2019. Each of the above-listed priority applications are incorporated herein by reference in their entirety for all purposes.

FIELD OF THE INVENTION

The present application is directed to arbitrating access to a shared resource, and more particularly, to arbitrating among portions of multiple transactions and transmitting a winning portion over one of a multiplicity of virtual channels associated with an interconnect on a clock cycle-by-clock cycle basis.

DESCRIPTION OF RELATED ART

A System on a Chip ("SoC") is an integrated circuit that includes multiple sub-systems, often referred to as Intellectual Property ("IP") agents or cores. IP agents are typically "reusable" blocks of circuitry designed to implement or perform a specific function. A developer of a SoC will typically layout and interconnect multiple IP agents on a chip so that they communicate with one another. By using IP agents, the time and cost of developing complex SoCs can be significantly reduced.

One of the challenges confronting the developers of SoCs is interconnecting the various IP agents on a chip so that they inter-operate. To address this issue, the semiconductor industry has adapted interconnect standards.

One such standard is the Advanced Microcontroller Bus Architecture (AMBA) protocol developed and promoted by the ARM Corporation located in Cambridge, United Kingdom. AMBA is a widely used bus interconnect standard for the connection and management of functional IP agents on SoCs.

With AMBA, transactions define a request and require a separate response transaction. With a write transaction, a source will request data to be written into a remote destination. Once the write operation is performed, the destination sends a confirmation response transaction back to the source. The write operation is considered complete only when the response transaction is received by the source. With read transactions, a source will request access to read a remote location. The read transaction is complete only when a response transaction (i.e., the accessed contents) are returned to the source.

With AMBA, an arbitration process is used to grant access to the interconnect bus among multiple competing transactions. During a given arbitration cycle, one of the competing transactions is selected as the winner. The interconnect bus is then controlled for the duration of the data portion of the winning transaction. The next arbitration cycle begins only after all the data for the current transaction has been completed. This process is continuously repeated, provided there are multiple outstanding transactions competing for access to the interconnect.

One issue with the AMBA standard is latency. The bus interconnect is arbitrated on a transaction-by-transaction basis. During any portion of a transaction, regardless of whether the transaction is a read, write or a response, the bus is controlled for the entire transaction. Once a transaction begins, it cannot be interrupted. For instance if the data portion of a transaction is four (4) cycles long, then all four cycles need to be completed before another transaction can gain access to the bus. As a result, (1) transactions cannot be arbitrated on a clock cycle-by-clock cycle basis and (2) all non-winning competing transaction(s) are required to wait until the data portions of the current transaction is complete. Both these factors tend to reduce the efficiency of the interconnect and the overall performance of the SoC.

SUMMARY

An arbitration system and method for arbitrating access to a shared interconnect among a plurality of sub-systems on a System on a Chip or SOC is disclosed. The arbitration system and method includes an arbitration element arranged, on a clock cycle-by-clock cycle basis, to (1) arbitrate among portions of multiple transactions generated by the plurality of sub-systems, (2) select a winning portion among the portions of the multiple transactions and (3) transmit the winning portion over one of a multiplicity of virtual channels associated with the interconnect.

By repeatedly performing (1) through (3), winning portions are interleaved and transmitted over the multiplicity of virtual channels over multiple clock cycles respectively. The arbitration of portions of multiple transactions over a multiplicity of virtual channels on a clock cycle-by-clock cycle basis results in a number of benefits, including reduced latency and a higher degree of efficiency and utilization of the interconnect. These attributes make the arbitration system and method as disclosed herein highly suitable for arbitrating access to an interconnect on a System on a Chip (SoC).

BRIEF DESCRIPTION OF THE DRAWINGS

The present application and the advantages thereof, may best be understood by reference to the following description taken in conjunction with the accompanying drawings in which:

FIG. 4 is a flow diagram illustrating operational steps for arbitrating and sending portion(s) of transactions over virtual channels of the shared interconnect in accordance with a non-exclusive embodiment.

FIG. 9A illustrates a Look Up Table (LUT) used for resolving both physical addresses and Source Based Routing (SBR) addresses into one or more IP ports in accordance with a non-exclusive embodiment of the invention.

In the drawings, like reference numerals are sometimes used to designate like structural elements. It should also be appreciated that the depictions in the figures are diagrammatic and not necessarily to scale.

DETAILED DESCRIPTION

Figure 1:
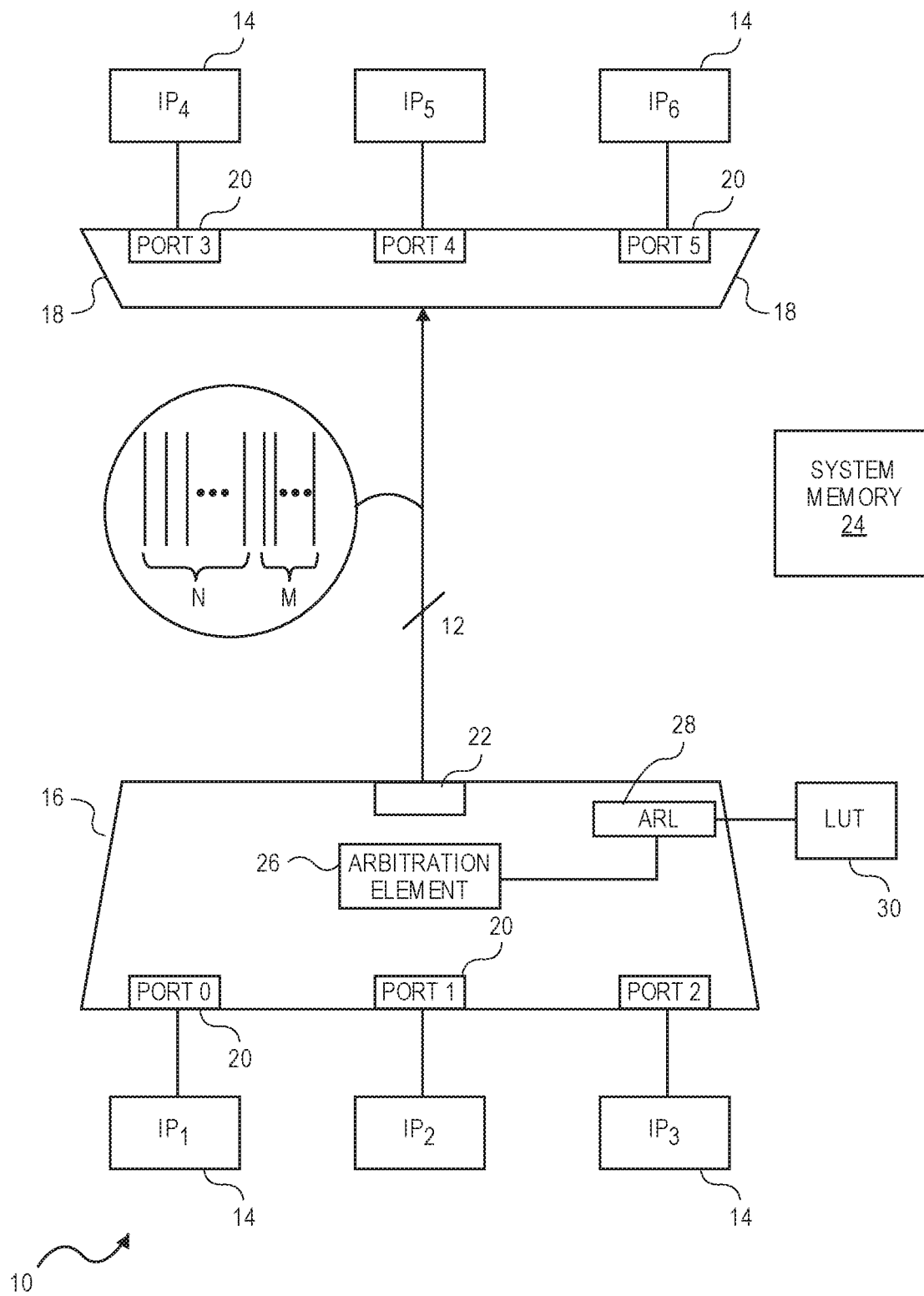
FIG. 1 is a block diagram of a shared interconnect for a System on a Chip (SoC) in accordance with a non-exclusive embodiment.

The present application will now be described in detail with reference to a few non-exclusive embodiments thereof as illustrated in the accompanying drawings. In the following description, numerous specific details are set forth in order to provide a thorough understanding of the present disclosure. It will be apparent, however, to one skilled in the art, that the present discloser may be practiced without some or all of these specific details. In other instances, well known process steps and/or structures have not been described in detail in order to not unnecessarily obscure the present disclosure.

Many of the integrated circuits under development today are extremely complex. As a result, many chip designers have resorted to the System on a Chip or "SoC" approach, interconnecting a multiple sub-systems or IP agents on a single piece of silicon. SoCs are now available or are being developed for wide variety of applications, such as consumer devices (e.g., handheld, mobile phones, tablet computers, laptop and desktop computers, media processing etc.), virtual or augmented reality (e.g., robotics, autonomous vehicles, aviation, etc.), medical instrumentation (e.g., imaging, etc.), industrial, home automation, industrial (e.g., smart appliances, home surveillance, etc.) and data center applications (e.g., network switches, attached storage devices, etc.).

The present application is broadly directed to an arbitration system and method for arbitrating access to a shared resource. Such a shared resource can be, for example, a bus interconnect, a memory resource, a processing resource, or just about any other resource that is shared among multiple vying parties. For the sake of illustration, the shared resources as described in detail below is an interconnect that is shared by a plurality of sub-systems on a System on a Chip or "SoC".

With an SoC, as described in detail below, there are a plurality of sub-systems that are capable of exchanging traffic with one another in the form of transactions, the shared resource is a physical interconnect, various transactions, or portions thereof, are transmitted over a multiplicity of virtual channels associated with the shared interconnect and one of a number of different arbitration schemes and/or priorities may be used to arbitrate access to the shared interconnect for the transmission of transactions between the sub-functions.

Transaction Classes

Within the above-mentioned shared interconnect used for SoCs, there are at least three types or classes of transactions, including Posted (P), Non-posted (NP) and Completion (C). A brief definition of each is provided in Table I below.

TABLE I

| Transaction Class | Description |
|---|---|
| Posted (P) | A transaction that requires no response (e.g., a write operation) |
| Non-posted (NP) | A transaction that requires a response transaction from the destination agent (e.g., a read or a write operation) |
| Completion (C) | A response transaction for a non-posted transaction. |

A Posted transaction, such as a write, requires no response transaction. Once a source writes data to a designated destination, the transaction is finished. With a Non-posted transaction, such as either a read or a write, a response is required. However, the response is bifurcated as a separate Completion transaction. In other words with a read, a first transaction is used for the read operation, while a separate, but related, Completion transaction is used for returning the read contents. With a Non-posted write, a first transaction is used for the write, while a second related Completion transaction is required for the confirmation once the write is complete.

Transactions, regardless of the type, can be represented by one or more packets. In some circumstances, a transaction may be represented by a single packet. In other circumstances, multiple packets may be needed to represent the entire transaction.

A beat is the amount of data that can be transmitted over the shared interconnect per clock cycle. For example if the shared interconnect is physically 128 bits wide, then 128 bits can be transmitted each beat or clock cycle.

In some circumstances, a transaction may need to be divided into multiple portions for transmission. Consider a transaction having a single packet that has a payload that is 512 bits (64 bytes). If the shared interconnect is only 128 bits wide (16 bytes), then the transaction needs to be segmented into four portions (e.g. 4×128=512) and transmitted over four clock cycles or beats. On the other hand if a transaction is only a single packet that is 128 bits wide or less, then the entire transaction can be sent in one clock cycle or beat. If the same transaction happens to include additional packets, then additional clock cycles or beats may be needed.

The term "portion" of a transaction is therefore the amount of data that can be transferred over the shared interconnect during a given clock cycle or beat. The size of a portion may vary depending on the physical width of the shared interconnect. For instance, if the shared interconnect is physically 64 data bits wide, then the maximum number of bits that can be transferred during any one cycle or beat is 64 bits. If a given transaction has a payload of 64 bits or less, then the entire transaction can be sent over the shared interconnect in a single portion. On the other hand if the payload is larger, then the packet has to be sent over the shared interconnect in multiple portions. A transaction with a payload of 128, 256 or 512 bits requires two (2), four (4) and eight (8) portions respectively. As such, the term "portion" or "portions" should therefore be broadly construed to mean either part of or an entire transaction that may be sent over the share interconnect during any given clock cycle or beat.

Streams

A stream is defined as the pairing of a virtual channel and a transaction class. For instance, if there are four (4) virtual channels (e.g., VC0, VC1, VC2 and VC3) and three (3) transaction classes (P, NP, C), then there are a maximum of twelve (12) different possible streams. The various combinations of virtual channels and transaction classes are detailed below in Table II.

TABLE II

| Stream Number | VC/TC Combination |
| --- | --- |
| 1 | VC0/NP |
| 2 | VC0/P |
| 3 | VC0/C |
| 4 | VC1/NP |
| 5 | VC1/P |
| 6 | VC1/C |
| 7 | VC2/NP |
| 8 | VC2/P |
| 9 | VC2/C |
| 10 | VC3/NP |
| 11 | VC3/P |
| 12 | VC3/C |

It should be noted that the number of transaction classes discussed above is merely exemplary and should not be construed as limiting. On the contrary, any number of virtual channels and/or transaction classes may be used.

Arbitration Over Virtual Channels of a Shared Interconnect

Referring to FIG. 1, a block diagram of an arbitration system 10 is shown. In a non-exclusive embodiment, the arbitration system is used for arbitrating access by a number of sub-functions 14 (i.e., $IP_1$, $IP_2$ and $IP_3$) to a shared interconnect 12 attempting to send transactions to upstream sub-functions 14 (i.e., $IP_4$, $IP_5$ and $IP_6$).

The shared interconnect 12 is a physical interconnect that is N data bits wide and includes M control bits. The shared interconnect 12 is also one-directional, meaning it handles traffic only from a source (i.e., $IP_1$, $IP_2$ and $IP_3$) to a destination (i.e., $IP_4$, $IP_5$ and $IP_6$).

In various alternatives, the number of N data bits can be any integer, but typically is some power of the number 2 (e.g., $2^1$, $2^2$, $2^3$, $2^4$, $2^5$, $2^6$, $2^7$, $2^8$ $2^9$ etc.) or (2, 4, 6, 8, 16, 32, 64, 128, 256 etc.) bits wide respectively. With most real-world applications, the number of N bits is either 32, 64, 128, 256 or even 512. However, it should be understood that these widths are merely illustrative and should not be construed as limiting in any manner.

The number of control bits M may also vary and be any number.

One or more logical channels (not illustrated), hereafter referred to as "virtual channels" or "VCs" are associated with the shared interconnect 12. Each virtual channel is independent. Each virtual channel may be associated with multiple independent streams. The number of virtual channels may widely vary. For example, up to thirty-two (32) or more virtual channels may be defined or associated with the shared interconnect 12.

In various alternative embodiments, each virtual channel may be assigned a different priority. One or more virtual channel(s) may be assigned a higher priority, while one or more other virtual channel(s) may be assigned a lower priority. The higher priority channels are awarded or arbitrated access to the shared interconnect 12 over the lower priority virtual channels. With other embodiments, each of the virtual channels may be given the same priority, in which case, no preference is given to one virtual channel versus another when awarding or arbitrating access to shared interconnect 12. In yet other embodiments, the priority assigned to one or more of the virtual channels may also dynamically change. For instance, in a first set of circumstances, all the virtual channels may be assigned the same priority, but in a second set of circumstances, certain virtual channel(s) can be assigned a higher priority than other virtual channel(s). Thus as circumstances change, the priority scheme used among the virtual channels can be varied to best meet current operating conditions.

Each of the sub-systems 14 is typically a block of "reusable" circuitry or logic, commonly referred to as an IP core or agent. Most IP agents are designed to perform a specific function, for example, controllers for peripheral devices such as an Ethernet port, a display driver, an SDRAM interface, a USB port, etc. Such IP agents are generally used as "building blocks" that provide needed sub-system functionality within the overall design of a complex system provided on an integrated circuit (IC), such as either an Application Specific Integrated Circuit (ASIC) or a Field Programmable Gate Array (FPGA). By using a library of available IP agents, a chip designer can readily "bolt" together various logic functions in the design of a more complex integrated circuit, reducing design time and saving development costs. Although sub-system agents 14 are described above in terms of a dedicated IP core, it should be understood that this is not a necessary requirement. On the contrary, a sub-system 14 can also be a collection of IP functions connected to or sharing a single port 20. Accordingly, the term "agent" should be broadly construed as any type of sub-system connected to a port 20, regardless if the sub-system performs a single function or multiple functions.

A pair of switches 16 and 18 provides access between each of the sub-system agents 14 and the shared interconnect 12 via dedicated access ports 20 respectively. With the exemplary embodiment shown:

(1) The sub-system agents $IP_1$, $IP_2$, and $IP_3$ connect with switch 16 via access Port 0, Port 1 and Port 2 respectively.

(2) The sub-system agents $IP_4$, $IP_5$, and $IP_6$ connect with switch 18 via Port 3, Port 4 and Port 5 respectively.

(3) In addition, an access port 22, via the interconnect 12, provides sub-system agents $IP_4$, $IP_5$, and $IP_6$ access to switch 16 in the aggregate.

The switches 16 and 18 perform multiplexing and de-multiplexing functions. Switch 16 selects up-stream traffic generated by the sub-system agents $IP_1$, $IP_2$, and/or $IP_3$ and sends the traffic down-stream over the shared interconnect 12. At the switch 18, a de-multiplexing operation is performed and the traffic is provided to a target sub-system agent (i.e., either $IP_4$, $IP_5$, or $IP_6$).

Each access port 20 has a unique port identifier (ID) and provides each sub-system agent 14 dedicated access to either switch 16 or 18. For instance, sub-system agents $IP_1$, $IP_2$ and $IP_3$ are assigned to access ports Port 0, Port 1 and Port 2 respectively. Similarly, the sub-system agents $IP_4$, $IP_5$ and $IP_6$ are assigned access ports Port 3, Port 4 and Port 5 respectively.

Besides providing ingress and egress points to/from the switches 16, 18, the unique port IDs 20 are used for addressing traffic between the sub-system agents 14. Each Port 20 has a certain amount of allocated addressable space in system memory 24.

In certain non-exclusive embodiments, all or some of the access ports 20 can also be assigned a "global" port identifier as well their unique port ID. Transactions and other traffic can be sent to all or some of the access ports assigned to the global port identifier. Accordingly, with the global identifier, transactions and other traffic can be widely disseminated or broadcast to all or some of the access ports 20, obviating the need to individually address each access port 20 using its unique identifier.

The switch 16 also includes an arbitration element 26, Address Resolution Logic (ARL) 28 and an address resolution Look Up Table (LUT) 30.

During operation, the sub-system agents $IP_1$, $IP_2$ and $IP_3$ generate transactions. As each transaction is generated, it is packetized by the originating sub-system agent 14 and then the packetized transaction is injected via the corresponding port 20 into a local switch 16. For instance, portions of transactions generated by $IP_1$, $IP_2$ and $IP_3$ are provided to switch 16 by via ports Port 0, Port 1 and Port 2 respectively.

The ports 20 each include a number of first-in, first-out buffers (not illustrated) for each of the virtual channels associated with the interconnect channel 12 respectively. In a non-exclusive embodiment, there are four (4) virtual channels. In which case, each port 20 includes four buffers, one for each virtual channel Again, it should be understood that the number of virtual channels and buffers contained in the ports 20 may vary and is not limited to four. On the contrary, the number of virtual channels and buffers may be more or less than four.

If a given transaction is represented by two (or more) portions, those portions are maintained in the same buffer. For instance, if interconnect 12 is 128 data bits wide and a transaction is represented by a packet containing a payload of 512 bits, then the transaction needs to be segmented into four (4) portions that are transmitted over four clock cycles or beats. On the other hand if the transaction can be represented by a single packet having a payload of 64 bits, then the single portion can be transmitted in one clock cycle or beat. By maintaining all the portion(s) of given transaction in the same buffer, the virtual channels remain logically independent. In other words, all the traffic associated with a given transaction is always sent over the same virtual channel as a stream and is not bifurcated over multiple virtual channels.

The arbitration element 26 is responsible for arbitrating among the competing buffered portions of transactions maintained by the various access ports 20. In a non-exclusive embodiment, the arbitration element 26 performs an arbitration every clock cycle, provided multiple competing transactions are available. The arbitration winner per cycle yields a portion of a transaction, from one of the sub-systems $IP_1$, $IP_2$ and $IP_3$, that is granted access to and is transmitted over the interconnect 12.

When generating transactions, the source sub-system $IP_1$, $IP_2$ and $IP_3$ ordinarily knows the address in the address space for the possible destination sub-system agents $IP_4$, $IP_5$ and $IP_6$, but does not know the information (e.g., the Port IDs 20 and/or 22) needed to route the transactions to their destinations. In one embodiment, the local Address Resolution Logic (ARL) 28 is used for resolving the known destination address into the needed routing information. In other words, a source sub-agent 14 may simply know that it wishes to access a given address in system memory 24. The ARL 28 is therefore tasked to access the LUT 30 and performs an address look up of the port(s) 20/22 along the delivery path to the final destination corresponding to the specified address. Once the ports 20/22 is/are known, this information is inserted in a destination field in the packet(s) of the transaction. As a result, the packet(s) is/are delivered to the ports 20/22 along the delivery path. As a general rule, down-stream nodes along the delivery path do not have to perform additional look up(s) since the required delivery information is already known and included in the destination field of the packet(s). With other types of transactions, referred to as Source Based Routing (SBR) as described in more detail below, the source IP agent knows the destination port address. As a result, the lookup performed by the ARL 28 typically does not need to be performed.

In an alternative embodiment, not all the nodes within the interconnect require an ARL 28 and LUT 30. For nodes that do not have these elements, transactions without needed routing information can be forwarded to a default node. At the default node, an ARL 28 and LUT 30 are accessed and the needed routing information can then be inserted into the headers of the packet(s) of transactions. The default node is typically upstream from the node without the ARL 28 and LUT 30. However, this is by no means a requirement. The default node, or nodes, can be located anywhere on the SoC. By eliminating ARLs 28 and LUTs 30 from certain nodes, their complexity can be reduced.

The ARL 28 may also be referred to as an "ordering point" because, besides decoding the forwarding destination for winning portion(s) of transactions, it defines a sequence order for the winning portion(s) of transactions within each virtual channel. As each arbitration is resolved, regardless of whether or not the ARL 28 is used to perform an address port lookup, the winning portions of transactions are inserted into a first-in, first out queue provided for each virtual channel. The winning portions of transactions then await their turn for transmission over the interconnect 12 in the buffer.

The ARL 28 is also used for defining "upstream" and down-stream" traffic. In other words any transactions generated by the IP agents 14 associated with switch 16 (i.e., $IP_1$, $IP_2$ and $IP_3$) is considered upstream with respect to the ARL 28. All transaction post the ARL 28 (i.e., transmitted to $IP_4$, $IP_5$ and $IP_6$) is considered down-stream traffic.

The IP agents 14 associated with switch 16 (i.e., $IP_1$, $IP_2$ and $IP_3$) may communicate and send transactions to one another, either directly or indirectly. With direct communication, often referred to as Source Based Routing (SBR), the IP agents 14 can send transactions to one another in a peer-to-peer model. With this model, the source IP agent knows the unique Port ID of its peer IP agents 14, bypassing the need to use the ARL 28 to access the LUT 30. Alternatively, the transactions between the IP agents associated with the switch 16 can be routed using the ARL 28. With this model, similar to that described above, the source IP agent only knows the address of the destination IP agent 14, but not the information needed for routing. The ARL 28 is then used to access the LUT 30, find the corresponding Port ID, which is then inserted into the destination field of the packet(s) of the transaction.

Packet Format

The IP agents 14 create and process transactions over virtual channels associated with the interconnect 12. Each transaction typically is made up of one or more packets. Each Packet typically has a fixed header size and format. In some instances, each packet may have a fixed sized payload. In other instances, packet payloads may vary in size, from large to small, or even with no payload at all.

Figure 2:
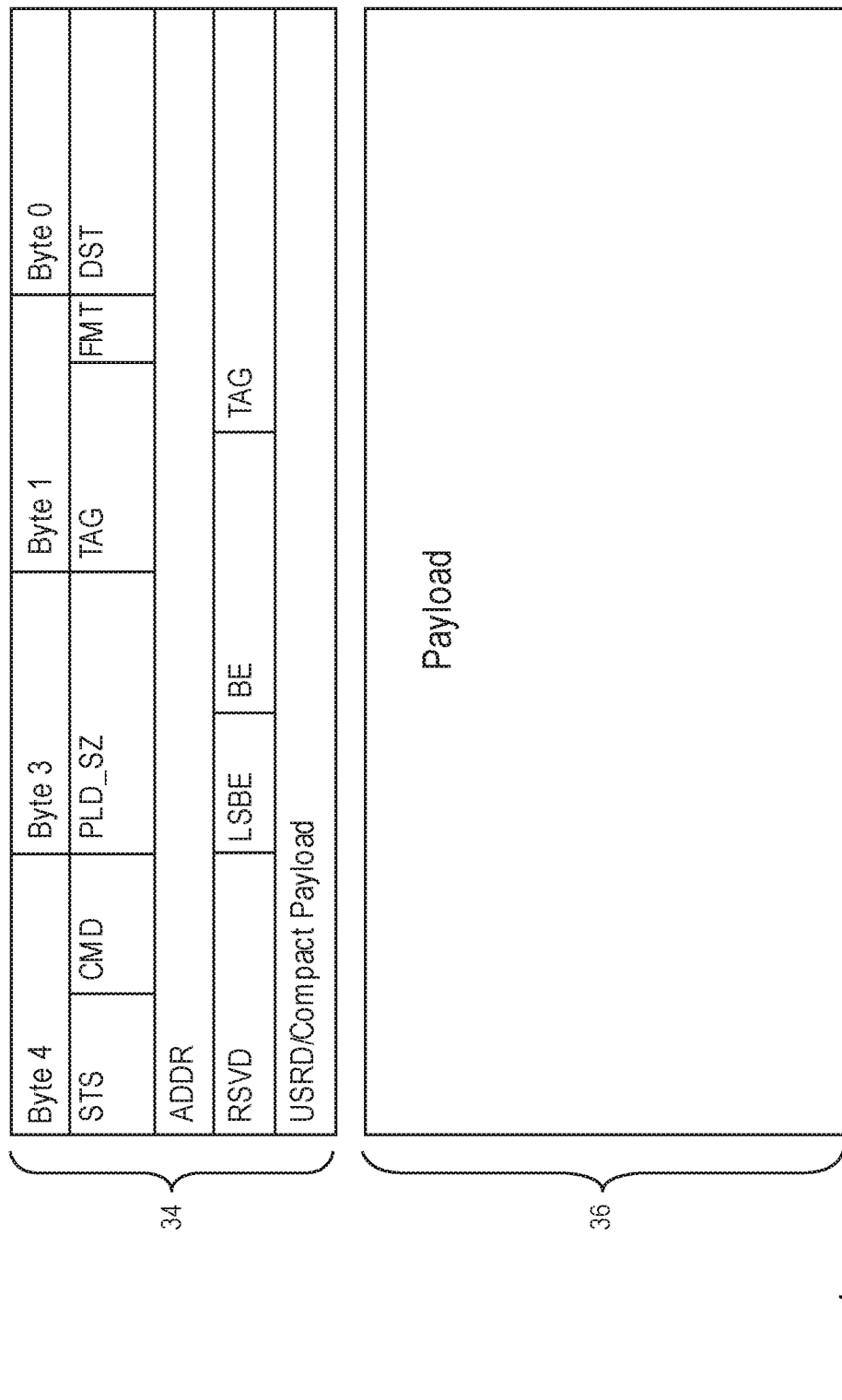
FIG. 2 is an exemplary packet of a transaction in accordance with a non-exclusive embodiment.

Referring to FIG. 2, an exemplary packet 32 is shown. The packet 32 includes a header 34 and a payload 36. In this particular embodiment, the header 34 is sixteen (16) Bytes in size. It should be understood that this size is exemplary and either a larger size (e.g., more Bytes) or smaller size (e.g., fewer Bytes) packets may be used. It should also be understood that headers 34 of packets 32 do not necessarily have to all be the same size. In alternative embodiments, the size of packet headers in a SoC may be variable.

The header 34 includes a number of fields including a destination identifier (DST_ID), a source identifier (SRC_ID), a payload size indicator (PLD_SZ), a reserved field (RSVD), a command field (CMD), a TAG field, a status (STS), a transaction ID field (TAG), an address or ADDR field, a USDR/Compact payload field, a transaction Class or TC field, a format FMT filed, and a Byte Enable (BE) field. The various fields of the header 34 are briefly described in Table III below.

The exemplary packet and above description covers many of basic fields that may be included in a packet. It should be understood that additional fields may be added or fields may be deleted as needed. For instance, a private signaling field may be used so a source and a destination may share private messages.

Arbitration

Figure 3A:
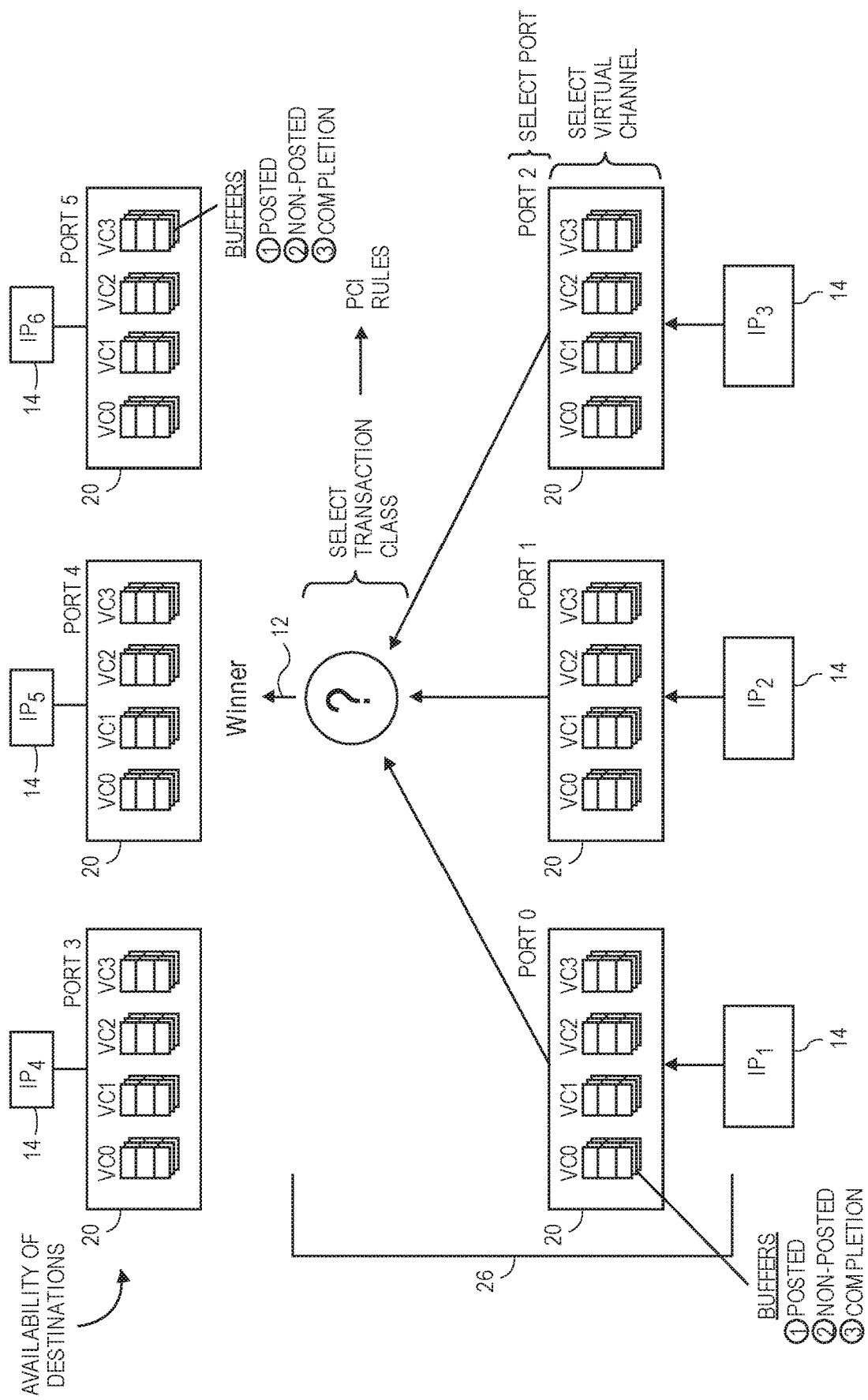
FIG. 3A is a logic diagram illustrating an arbitration element in accordance with a first non-exclusive embodiments.

Referring to FIG. 3A, a logic diagram illustrating the arbitration logic performed by the arbitration element 26 with Peripheral Component Interconnect (PCI) ordering is shown.

With PCI ordering, each Port 20 includes separate buffers for each virtual channel and transaction class (P, NP and C) combination. For instance, with four virtual channels (VC0, VC1, VC2 and VC3), the Ports 0, Port 1 and Port 2 each have twelve first-in, first-out buffers. In other words for each Port 20, a buffer is provided for each transaction class (P, NP, and C) and virtual channel (VC0, VC1, VC2 and VC30 combination.

As each IP agent 14 (e.g., IP$_1$, IP$_2$ and IP$_3$) generates transactions, the resulting packets are placed in the appro-

TABLE III

| Name of Field | Description |
|---|---|
| DST | Specifies the corresponding Port ID for the targeted IP agent 14. |
| SRC | Specifies the Port ID for the sending IP agent 14. |
| PLD_SZ | Specifies the size of the payload of the packet. |
| CMD | Specifies the type of transaction/command the packet contains. Exemplary commands may include Incremental Read, Incremental Write, Compact Read, Compact Write, Write to FIFO, Destructive Incremental Read, Wrap, etc. |
| TAG | Specifies a transaction ID for the packet. Transactions IDs are used for matching Non-posted transactions and their corresponding Completion transactions. When a Completion transaction including a matching transaction ID in the TAG field is received, the corresponding Non-posted read or write operation is complete. |
| ADDR | Specifies the physical address in system memory 24 of the request |
| USRD/Compact payload | If the payload of the packet is sufficiently small, it can be transported in this field in the header, not the payload. This field can also be used to transport a private or secure message between the source and the destination IP ports. |
| STS | This field is valid only with Completion packets. Specifies the status of the corresponding Non-posted transaction, (i.e., either a successful completion or a failed transaction). |
| RSVD | This is a reserved field that can also be used to transport a private or secure message between the source and the destination IP ports. |
| FMT | Specifies the format specification if multiple header formats are defined and used. |
| BE | Byte Enable, indicates which bytes in the payload are valid. |

The payload 36 contains the contents of the packet. The size of the payload may vary. In some instances, the payload may be large. In other instances, it could be small. In yet other instances, if the content is very small or "compact", it can be transported in the USRD field of the header 34.

The type of transaction will often dictate whether or not the packet(s) used to represent the transaction has/have payloads or not. For example with either a Posted or Non-posted read, the packet(s) will designate the location address to be accessed, but will typically have no payload. The packets for the related Completion transaction, however, will include payload(s) containing the read content. With both Posted and Non-posted write transactions, the packet(s) will include a payload containing the data to be written to the destination. With Non-posted versions of a write, the packets for the Completion transaction will ordinarily not defined a payload. However, in some situations, a Completion transaction will define a payload.

priate buffer, based on transaction type, in the corresponding port (e.g., Port 0, Port 1 and Port 2) respectively. For instance, Posted (P), Non-posted (NP) and Completion (C) transactions generated by IP$_1$ are each placed in the Posted, Non-posted and Completion buffers for the assigned virtual channel in Port 0 respectively. Transactions generated by IP$_2$ and IP$_3$ are similarly placed in the Posted, Non-posted and Completion buffers for the assigned virtual channels in Ports 1 and Port 2 in a similar manner.

If a given transaction is represented by multiple packets, all of the packets of that transaction are inserted into the same buffer. As a result, all of the packets of the transaction are eventually transmitted over the same virtual channel With this policy, the virtual channels remain independent, meaning different virtual channels are not used for transmission of multiple packets associated with the same transaction.

Within each port 20, packets can be assigned to a given virtual channel in a number of different ways. For instance, the assignment can be arbitrary. Alternatively, the assignment can be based on workload and the amount of outstanding traffic for each of the virtual channels. If one channel is very busy and the other not, then the port 20 will often attempt to balance the load and assign newly generated transaction traffic to under-utilized virtual channels. As a result, routing efficiency is improved. In yet other alternatives, transaction traffic can be assigned to a particular virtual channel based on urgency, security, or even a combination of both. If a certain virtual channel is given a higher priority and/or security than others, then high priority and/or secure traffic is assigned to the higher priority virtual channel. In yet other embodiments, a port 20 can be hard-coded, meaning the port 20 has only one virtual channel and all traffic generated by that port 20 is transmitted over the one virtual channel. In yet other embodiments, the assignment can be based on the route chosen to reach the destination port 20.

In yet other embodiments, the assignment of virtual channels can be implemented by the source IP agents 14, either alone or in cooperation with its corresponding port 20. For example, a source IP agent 14 can generate a control signal to the corresponding port 20 requesting that packet(s) of a given transaction be assigned to a particular virtual channel. IP agents 14 can also make assignment decisions that are arbitrary, hard coded, based on balanced usage across all the virtual channels, security, urgency, etc., as discussed above.

In selecting an arbitration winner, the arbitration element 26 performs multiple arbitration steps per cycle. These arbitration steps include:
(1) Selecting a port;
(2) Selecting a virtual channel; and
(3) Selecting a transaction class.

The above order (1), (2) and (3) is not fixed. On the contrary, the above three steps may be completed in any order. Regardless of which order is used, a single arbitration winner is selected each cycle. The winning transaction is then transmitted over the corresponding virtual channel associated with the interconnect 12.

For each arbitration (1), (2) and (3) performed by arbitration element 26, a number of arbitration schemes or rule sets may be used. Such arbitration schemes may include strict or absolute priority, a weighed priority where each of the four virtual channels is assigned a certain percentage of transaction traffic or a round-robin scheme where transactions are assigned to virtual channels in a predefined sequence order. In additional embodiments, other priority schemes may be used. Also, it should be understood that the arbitration element 26 may dynamically switch among the different arbitration schemes from time-to-time and/or use the same or different arbitration schemes for each of the (1), (2) and (3) arbitrations respectively.

In an optional embodiment, availability of the destination ports 20 defined by the outstanding transaction(s) considered during a given arbitration cycle are considered. If a buffer in a destination port 20 does not have the resources available to process a given transaction, then the corresponding virtual channel is not available. As a result, the transaction in question does not compete in the arbitration, but rather, waits until a subsequent arbitration cycle when the target resource becomes available. On the other hand, when target resource(s) is/are available, the corresponding transaction(s) are arbitrated and compete for access to the interconnect 12.

The availability of the destination ports 20 may be checked at different times with respect to the multiple arbitration steps (1), (2) and (3) noted above. For instance, the availability check can be performed prior to the arbitration cycle (i.e., prior to completion of any of steps (1), (2) and (3)). As a result, only transactions that define available destination resources is/are considered during the subsequent arbitration. Alternatively, the availability check can be performed intermediate any of the three arbitration steps (1), (2) and (3), regardless of the order in which they are implemented.

There are advantages and disadvantages in performing the destination resource availability check early or late in the arbitration process. By performing the check early, possible competing portions of transactions can potentially be eliminated from the competition if their destinations are not available. However, early notice of availability may create a significant amount of overhead on system resources. As a result, depending on circumstances, it may be more practical to perform the availability check later in a given arbitration cycle.

For the arbitration step involving the selection of a transaction class, a number of rules are defined to arbitrate among competing portions of N, NP and C transactions. These rules include:

For Posted (P) Transactions

A Posted transaction portion may not pass another Posted transaction portion;
A Posted transaction portion must be able to pass a Non-posted transaction portion to avoid deadlock;
A Posted transaction portion must be able to pass a Completion if both are in a strong order mode. In other words in the strong mode, the transaction need to be performed strictly in accordance with the rules and the rules cannot be relaxed; and
A Posted request is permitted to pass a Completion, but passage is not mandatory, if any transaction portion has its Relaxed Order (RO) bit set. With relaxed order, the rules are generally followed, however exceptions can be made.

For Non-Posted (NP) Transactions

A Non-posted transaction portion must not pass a Posted transaction portion;
A Non-posted transaction portion must not pass another Non-posted transaction portion;
A Non-posted transaction portion must not pass a Completion if both are in the strong order mode; and
A Non-posted transaction portion is permitted to pass a Completion, but is not mandatory, if any transaction portion has its RO bit set.

For Completion (C) Transactions

A Completion must not pass a Posted transaction portion if both are in the strong order mode;
A Completion is permitted to pass a Posted transaction portion, but is not mandatory, if any transaction portion has its RO bit set;
A Completion must not pass a Non-posted transaction portion if both are in the strong order mode;
A Completion is permitted to pass a Non-posted transaction portion, but is not mandatory, if any transaction portion has its RO bit set; and A Completion is not permitted to pass another Completion.

Table IV below provides a summary of the PCI ordering rules. In the boxes with no (a) and (b) options, then the strict ordering rules need to be followed. In the boxes of the Table having (a) and (b) options, either strict order (a) or relaxed order (b) rules may be applied, depending on if the RO bit is reset or set respectively. In various alternative embodiments, the RO bit can be set or reset either globally or on individually on the packet level.

TABLE IV

| | Row Pass Column? | | |
|---|---|---|---|
| | Posted Request (Column 2) | Non-posted Request (Column 3) | Completion (Column 4) |
| Posted Request Row A | No | Yes | (a) Yes (b) Y/N |
| Non-posted Request Row B | No | No | (a) No (b) Y/N |
| Completion Row C | (a) No (b) Y/N | (a) Yes (b) Y/N | No |

The arbitration element 26 selects an ultimate winning transaction portion by performing, in no particular order, arbitrations among competing Ports 20, virtual channels and transactions classes respectively. The winning portion per cycle gains access to the shared interconnect 12 and is transmitted over the corresponding virtual channel.

Figure 3B:
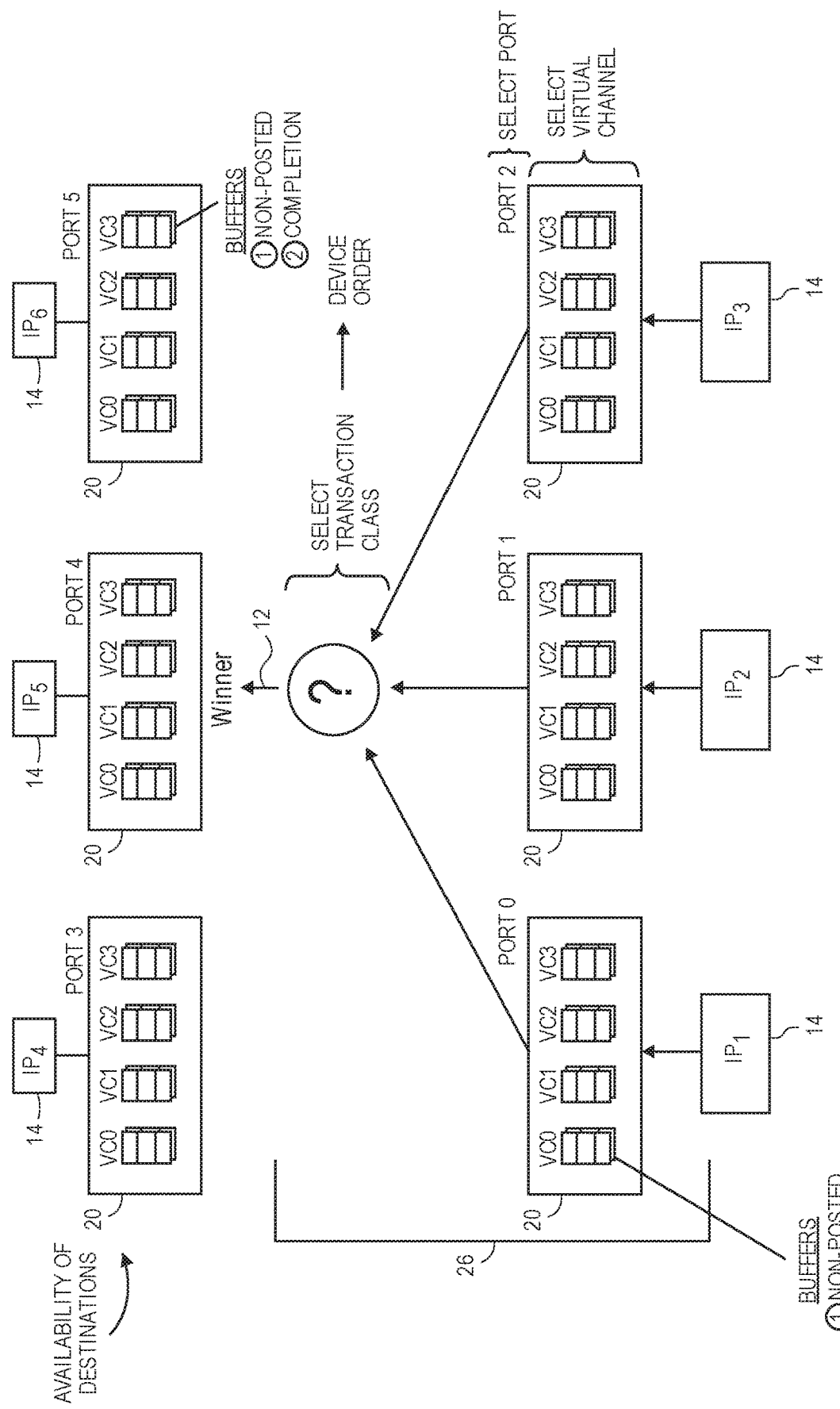
FIG. 3B is a logic diagram illustrating an arbitration element in accordance with a second non-exclusive embodiment.

Referring to FIG. 3B, a logic diagram illustrating the arbitration logic performed by the arbitration element 26 with Device ordering is shown. The arbitration process, and possibly the consideration of available destination resources, is essentially the same as described above, except for two distinctions.

First, with Device ordering, there are only two transaction classes defined, including (a) Non-posted read or write transactions where a response for every request is required and (b) Completion transactions, which are the required responses. Since there are only two transaction classes, there are only two (2) buffers per virtual channel in each Port 20. For instance, with four (4) virtual channels (VC0, VC1, VC2 and VC3), each Port 20 (e.g., Port 0, Port 1 and Port 2) has a total of eight (8) buffers.

Second, the rules for selecting a Transaction for Device ordering are also different than PCI ordering. With Device ordering, there are no strict rules governing the selection of one class over the over class. On the contrary, either transaction class can be arbitrarily selected. However, common practice typically calls for favoring Completion transactions to free up resources that may not be available until a Completion transaction is resolved.

Otherwise, the arbitration process for Device order is essentially the same as described above. In other words for each arbitration cycle, the arbitration steps (1), (2) and (3) are performed, in any particular order, to select an arbitration winner. When the transaction class arbitration is performed, Device order rather than PCI order rules are used. In addition, the availability of destination resources and/or virtual channels may also be considered either prior to or intermediate any of the arbitration steps (1), (2) and (3).

Operational Flow Diagram

As previously noted, the above-described arbitration scheme can be used for sharing access to any shared resource and is not limited to use with just a shared interconnect. Such other shared resources may include the ARL 28, a processing resource, a memory resource such as the LUT 30, or just about any other type of resource that is shared among multiple parties vying for access.

Referring to FIG. 4, a flow diagram 40 illustrating operational steps for arbitrating access to a shared resource is shown.

In step 42, the various source sub-system agents 14 generate transactions. The transactions can be any of the three classes, including Posted (P), Non-posted (NP) and Completion (C).

In step 44, each of the transactions generated by the source sub-system agents 14 are packetized. As previously noted, packetization of a given transaction may result in one or multiple packets. The packets may also vary in size, with some packets having large payloads and others having small or no payloads. In situations where a transaction is represented by a single packet having a data payload 36 that is smaller than the width of the interconnect 12, the transaction can be represented by a single portion. In situations where a transaction is represented by multiple packets, or a single packet with a data payload 36 that is larger than the access width of the shared resource, then multiple portions are needed to represent the transaction.

In step 46, the portion(s) of the packetized transactions generated by each of the sub-system agents 14 are injected into the local switch 16 via its corresponding port 20. Within the port 20, the packet(s) of each transaction are assigned to a virtual channel. As previously noted, the assignment can be arbitrary, hard coded, based on balanced usage across all the virtual channels, security, urgency, etc.

In step 48, the portion(s) of the packetized transactions generated by each of the sub-system agents 14 are stored in the appropriate, first-in, first-out, buffer by both transaction class and by their assigned virtual channel (e.g., VC0, VC1, VC2 and VC3) respectively. As previously noted, virtual channels may be assigned by one of a number of different priority schemes, including strict or absolute priority, round-robin, weighted priority, least recently serviced, etc. If a given transaction has multiple portions, each portion will be stored in the same buffer. As a result, the multiple portions of a given transaction are transmitted over the same virtual channel associated with the interconnect 12.

Each buffer also has an associated counter that maintains a current count of the number of portions of transactions in the buffer. When portions of transactions in the buffer win an arbitration and gain access to the shared interconnect, the counter is incremented. As transaction portions are injected into a buffer, the associated counter is decremented. If a particular buffer is filled, meaning the buffer can no longer receive additional portions of transactions, the counter is decremented to zero.

In steps 50, 52 and 54, first, second and third level arbitrations are performed. As previously noted, the selection of a Port 20, a virtual channel and a transaction class can be performed in any order.

Element 56 may be used to maintain the rules used to perform the first, second and third levels of arbitration. In each case, the element 56 is used as needed in resolving each of the arbitration levels. For instance, element 56 may maintain PCI and/or Device ordering rules. Element 56 may also contain rules for implementing several priority schemes, such as strict or absolute priority, weighted priority, round robin, etc., and the logic or intelligence for deciding which to use in a given arbitration cycle.

In step 58, a winner of the arbitration is determined. In step 60, the winning portion is placed in a buffer used for accessing the shared resource and a counter associated with the buffer is decremented.

In step 62, the buffer associated with the winning portion is incremented since the winning portion is no longer in the buffer.

In step 64, the winning portion gains access to the shared resource. Once the access is complete, the buffer for the shared resource is incremented The steps 42 through 64 are continually repeated during successive clock cycles respectively. As different winning portions, each gains access to the shared resource.

Interleaving—Example One

Transactions can be transmitted over the interconnect 12 in one of several modes.

In one mode, referred to as the "header in-line", mode the header 34 of packet(s) 32 of a transaction are always transmitted first ahead of the payload 36 in separate portions or beats respectively. The header in-line mode may or may not be wasteful of the bits available on the interconnect 12, depending the relative size of the header 34 and/or the payload 36 with respect to the number of data bits N of the interconnect 12. For instance, consider an interconnect 12 that is 512 bits wide (N=512) and a packet having a header that is 128 bits and a payload of 256 bits. With this scenario, the 128 bits of the header are transmitted in a first portion or beat, while the remaining 384 bits of bandwidth of the interconnect 12 are not used. In a second portion or beat, the 256 bits of the payload 36 are transmitted, while the remaining 256 bits of the interconnect 12 are not used. In this example, a significant percentage of the bandwidth of the interconnect is not used during the two beats. On the other hand if the majority of the packets of transactions are the same size or larger than the interconnect, than the degree of wasted bandwidth is reduced or possibly eliminated. For example with headers and/or payloads that are 384 or 512 bits, the amount of waste is either significantly reduced (e.g., with 384 bits) or eliminated altogether (e.g., with 512 bits).

In another mode, referred to as "header on side-band", the header 34 of a packet is transmitted "on the side" of the data, meaning using the control bits M, while the payload 36 is transmitted over the N data bits of the interconnect 12. With the header on side band mode, the number of bits or size of the payload 36 of a packet 32 determines the number of beats needed to transmit the packet over a given interconnect 12. For instance, with a packet 32 having a payload 36 of 64, 128, 256 or 512 bits and an interconnect 12 having 128 data bits (N=128), the packet requires 1, 1, 2 and 4 beats respectively. With the transmission of each of the beat(s), the header information is transmitted over the control bits M along with or "on the side" of the data of the payload over the N data bits of the interconnect 12.

In yet another mode, the header 34 of packets 32 are transmitted in line with the payload, but there is no requirement that the header 34 and the payload 36 must be transmitted in separate portions or beats. If a packet 32 has a header 34 that is 128 bits and a payload 36 that is 128 bits, then the total size is 256 bits (128+128). If the N data bits of interconnect 12 is 64, 128, 256 or 512 bits wide, then a packet of 256 bits is transmitted in 4, 2, 1 and 1 beats respectively. In another example, a packet 32 has a header of 128 bits and a payload 36 of 256 bits, or a total packet size of 384 bits (128+256). With the same interconnect 12 of N data bits of 64, 128, 256 or 512 wide, the packet is transmitted in 6, 3, 2, or 1 beats respectively. This mode will always be at least as efficient or more efficient as the header in-line mode described above.

Figure 5:
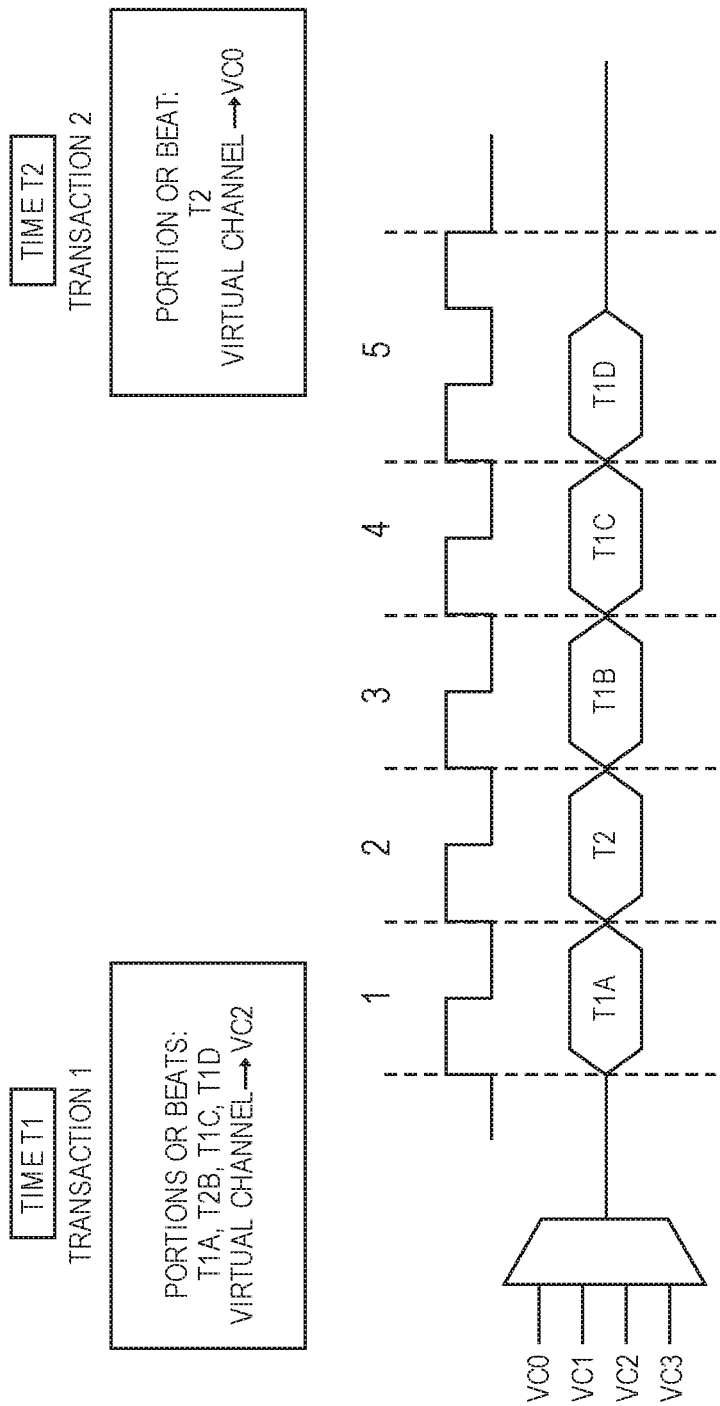
FIG. 5 illustrates a first example of the interleaving the transmission of portions of different transactions over virtual channels of the shared interconnect in accordance with a non-exclusive embodiment.

Referring to FIG. 5, a first example of the interleaving of portions of different transactions over multiple virtual channels is illustrated. In this example, for the sake of simplicity, only two transactions are defined. The two transactions are competing for access to shared interconnect 12, which is 128 data bits wide (N=128) in this example. The details of the two transactions include:

(1) Transaction 1 (T1), which was generated at Time T1 and which is assigned to virtual channel VC2. The size of T1 is four beats, designated as T1A, T1B, T1C and T1D; and (2) Transaction 2 (T2), which was generated at Time T2 (after Time T1) is assigned to virtual channel VC0. The size of T2 is a single portion or beat.

In this example, VC0 is assigned absolute or strict priority. Over the course of multiple cycles, the portions of the two transactions T1 and T2 are transmitted over the shared interconnect, as depicted in FIG. 5, as follows:

Cycle 1: Beat T1A of T1 is transmitted over VC2 because it is the only available transaction;

Cycle 2: Beat T1B of T1 and the single portion of T2 are competing for access to the interconnect 12. Since VC0 has strict priority, T2 automatically wins. Accordingly, the beat of T2 is transmitted over VC0.

Cycle 3: Since there are no competing transactions, beat T1B of T1 is transmitted over VC2.

Cycle 4: Since there are no competing transactions, beat T1C of T1 is transmitted over VC2.

Cycle 5: Since there are no competing transactions, beat T1D of T1 is transmitted over VC2.

This example illustrates (1) with a virtual channel with absolute priority, access to the shared interconnect 12 is immediately awarded whenever traffic becomes available, regardless of whether or not other traffic has been previously waiting and (2) the winning portions or beats of different transactions are interleaved and transmitted over the different virtual channels associated with the interconnect 12. In this example, virtual channel VC0 was given absolute priority. It should be understood that with absolute or strict priority schemes, any of the virtual channels may be assigned the highest priority.

Interleaving—Example Two

Figure 6:
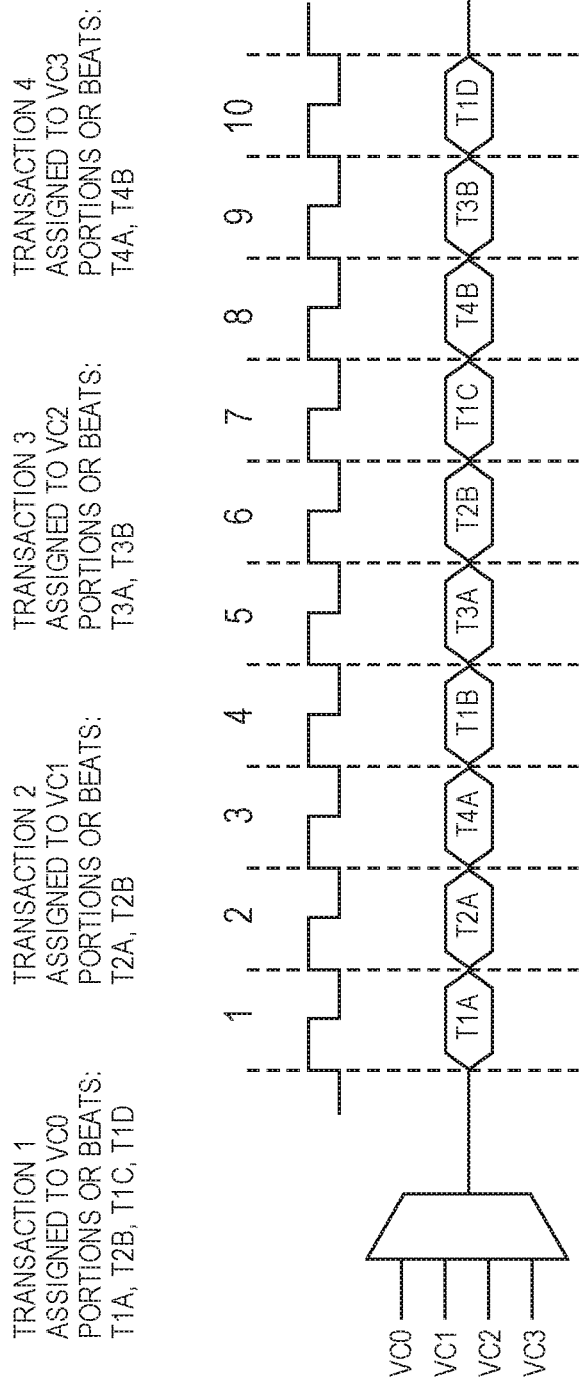
FIG. 6 illustrates a second example of the interleaving the transmission of portions of different transactions over virtual channels of the shared interconnect in accordance with a non-exclusive embodiment.

Referring to FIG. 6, a second example of the interleaving of portions of different transactions over multiple virtual channels is illustrated.

In this example, the priority scheme for access to the interconnect 12 is weighted, meaning VC0 is awarded access (40%) of the time and VC1-VC3 are each awarded access (20%) of the time respectively. Also, the interconnect is 128 bits wide.

Further in this example, there are four competing transactions, T1, T2, T3 and T4:

T1 is assigned to VC0 and includes four (4) portions or beats T1A, T1B, T1C and T1D;

T2 is assigned to VC1 and includes two (2) portions or beats T2A and T2B;

T3 is assigned to VC2 and includes two (2) portions or beats T3A and T3B; and

T4 is assigned to VC3 and includes two (2) portions or beats T4A and T4B.

With this example the priority scheme is weighed. As a result, each virtual channel will win according to its weight ratio. In other words over the course of ten cycles, VC0 will win four times and VC1, VC2 and VC3 will each win two times. For instance, as illustrated in FIG. 6:

The four portions or beats T1A, T1B, T1C and T1D of T1 are transmitted over VC0 in four (40%) of the ten (10) cycles (i.e., cycles 1, 4 7 and 10);

The two portions or beats of T2A and T2B of T2 are transmitted over VC1 in two (20%) of the ten (10) cycles (i.e., cycle 2 and cycle 6);

The two portions or beats of T3A and T3B of T3 are transmitted over VC2 in two (20%) of the ten (10) cycles (i.e., cycle 5 and cycle 9); and The two portions or beats of T4A and T4B of T4 are transmitted over VC3 in two (20%) of the ten (10) cycles (i.e., cycle 3 and cycle 8);

This example thus illustrates: (1) a weighted priority scheme where each virtual channel is awarded access to the interconnect 12 based on a predetermined ratio and (2) another illustration of the winning portions of different transactions being interleaved and transmitted over different the virtual channels associated with the interconnect 12.

It should be understood with this weighted example there is sufficient traffic to allocate portions of transactions to the various virtual channels in accordance with the weighted ratios. If the amount of traffic on the other hand is insufficient, then the weighted ratios can be either strictly or not strictly enforced. For example, if there is a large degree of traffic on virtual channel VC3 and limited to no traffic on the other virtual channels VC0, VC1 and VC2, then VC3 will carry all or a bulk of the traffic if the weighted ratio is strictly enforced. As a result, however, the interconnect 12 may be under-utilized as portions of transactions may not be sent every clock cycle or beat. On the other hand if the weighted ratio is not strictly enforced, then it is possible for the transaction traffic to be reallocated to increase the utilization of the interconnect (e.g., traffic is sent over a higher number of cycles or beats).

The above two examples are applicable regardless which of the above-described transmission modes are used. Once transaction(s) is/are divided into portions or beats, they can be interleaved and transmitted over the shared interconnect 12 using any of the arbitration schemes as defined herein.

The above-described arbitration schemes represent just a few examples. In other examples, low jitter, weighted, strict, round-robin or just about any other arbitration scheme may be used. The arbitration schemes listed or described herein should therefore be considered as exemplary and not limiting in any manner.

Multiple Simultaneous Arbitrations

Up to now, for the sake of simplicity, only a single arbitration has been described. It should be understood, however, that in real-world applications, such as on a SoC, multiple arbitrations may occur simultaneously.

Figure 7:
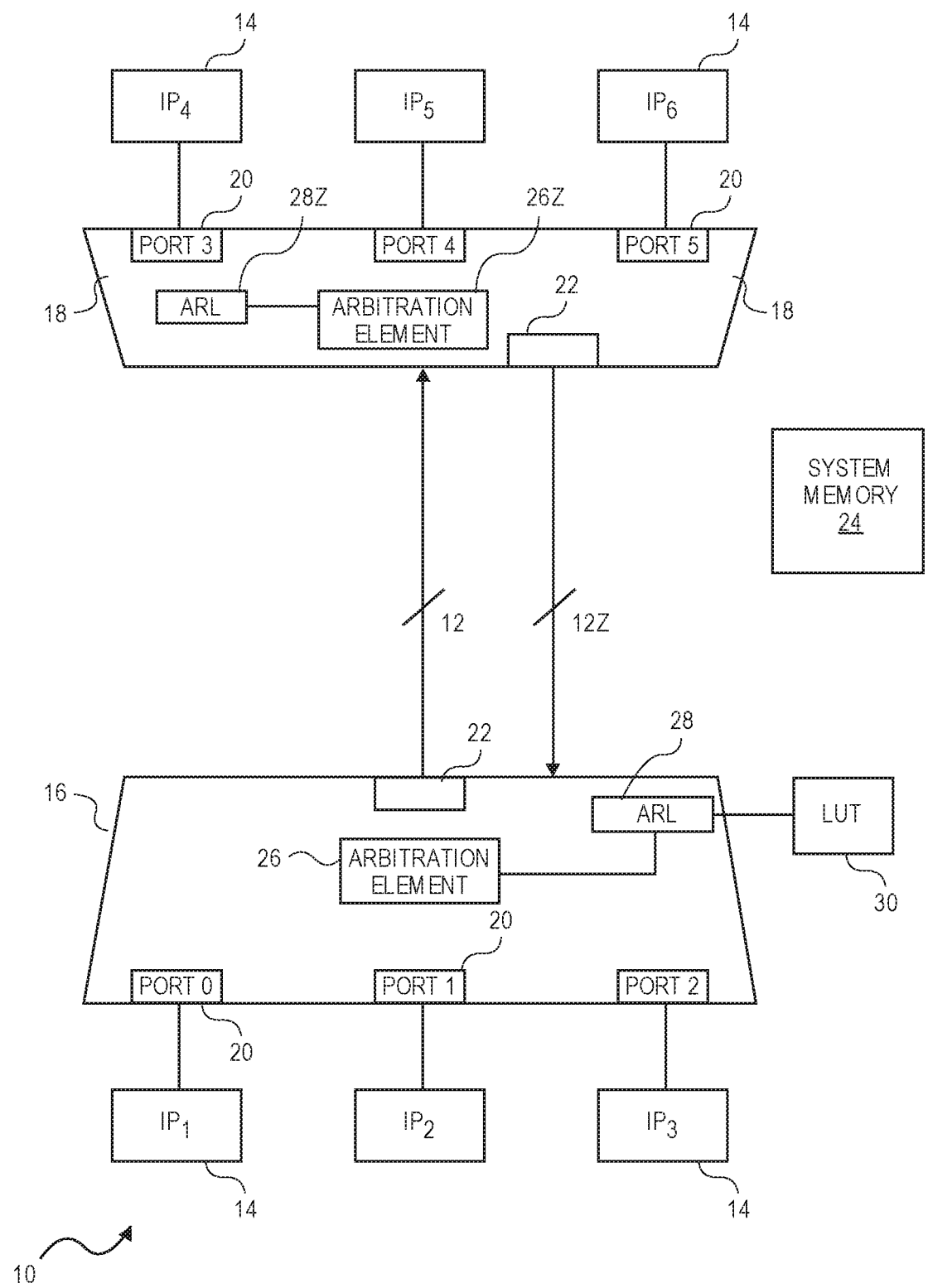
FIG. 7 illustrates is a block diagram of two shared interconnects for handling traffic in two directions in accordance with another non-exclusive embodiment of the invention.

Referring to FIG. 7, a block diagram of two shared interconnects 12 and 12Z for handling traffic in two directions between switches 16, 18 is illustrated. As previously described, the switch 16 is responsible for directing transaction traffic from source sub-functions 14 (i.e., $IP_1$, $IP_2$ and $IP_3$) to destination sub-functions 14 (i.e., $I_{P4}$, $I_{P5}$ and $I_{P6}$) over the shared interconnect 12. To handle transactional traffic in the opposite direction, switch 18 includes arbitration element 26Z and optionally ARL 28Z. During operation, elements 26Z and ARL 28Z operate in the complement of that described above, meaning transaction traffic generated by source IP agents 14 (i.e., $IP_4$, $IP_5$ and $IP_6$) is arbitrated and sent over shared interconnect 12Z to destination IP agents (i.e., $IP_1$, $IP_2$ and $IP_3$). Alternatively, the arbitration can be performed without the ARL 28Z, meaning the arbitration simply decides among competing ports 20 (e.g., Port 3, port 3 or Port 5) and the portion of the transaction associated with the winning port is transmitted over the interconnect 12, regardless of the final destination of the portion. As elements 12Z, 26Z and 28Z have previously been described, a detailed explanation is not provided herein for the sake of brevity.

In a SoC, there can be multiple levels of sub-functions 14 and multiple shared interconnects 12. With each, the above described arbitration scheme can be used to arbitrate among transactions sent over the interconnects 12 between the various sub-functions simultaneously.

Interconnect Fabric

Figure 8:
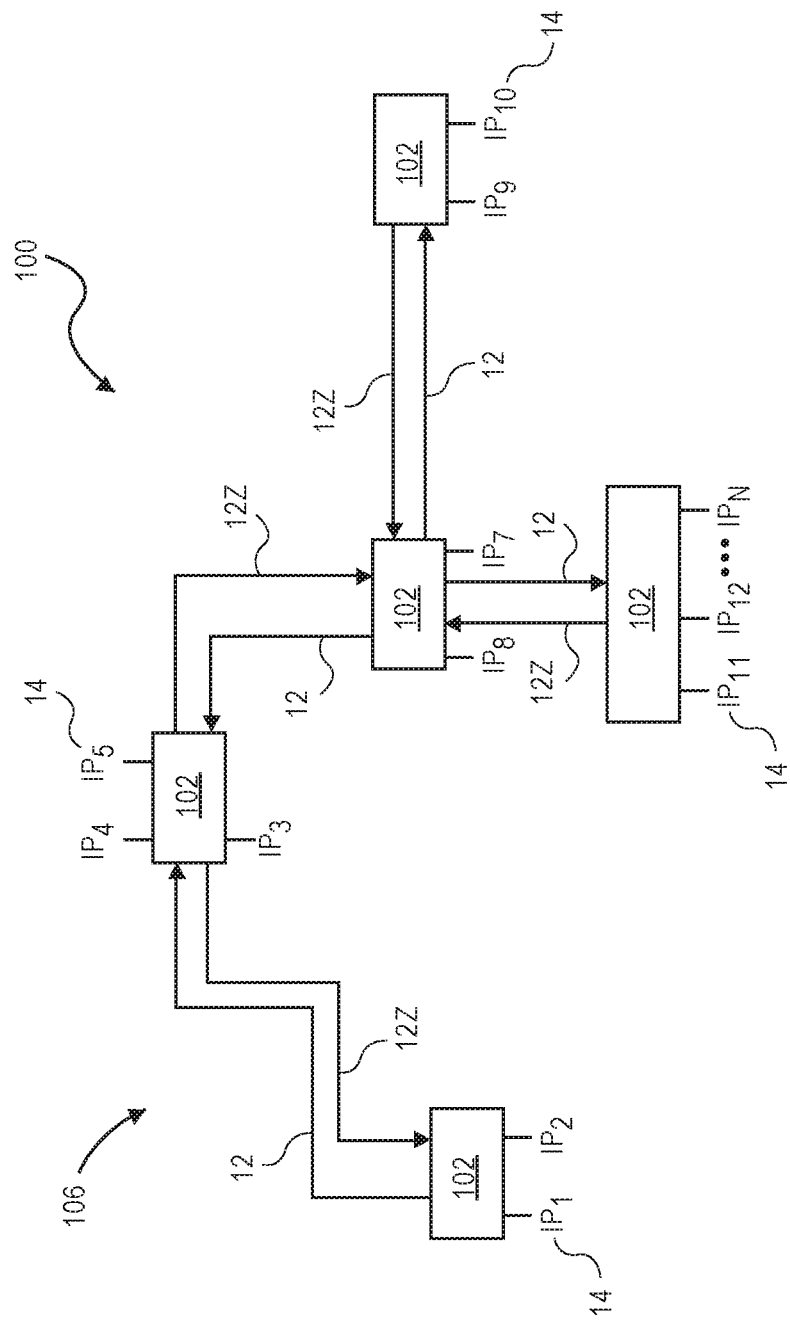
FIG. 8 illustrates a block diagram of an exemplary interconnect fabric of a SoC in accordance with a non-exclusive embodiment of the present invention.

Referring to FIG. 8, an exemplary SoC 100 is illustrated. The SoC 100 includes a plurality of IP agents 14 ($IP_1$, $IP_2$, $IP_3$, . . . $IP_N$). Each IP agent 14 is coupled to one of several nodes 102. Shared interconnects 12, 12Z, running in opposing directions, are provided between the various nodes 102. With this arrangement, transactions can flow in both directions between each pair of nodes 102 as described above with respect to FIG. 7 for example.

In a non-exclusive embodiment, each node 102 includes various switches 16, 18, access ports 20 for connecting to local IP agents 14, access ports 22 for connecting to the shared interconnects 12, 12Z, an arbitration element 26, an optional ARL 28 and an optional LUT 30. In alternative embodiments, the nodes may not include the ARL 28 and/or LUT 30. For nodes 102 that do not have these elements, transactions without needed routing information can be forwarded to a default node as previously discussed. As each of these elements was previously described with regard to FIG. 1, a detailed explanation is not provided herein for the sake of brevity.

Collectively, the various nodes 102 and bi-directional interconnects 12, 12Z, define an interconnect fabric 106 for the SoC 100. The interconnect fabric 106 as illustrated is relatively simple for the sake of clarity. It should be understood, that in actual embodiments, the interconnect fabric on an SoC 100 can be highly complex, including hundred or even thousands of IP agents 14, multiple levels of nodes 102, all interconnected by a large number of interconnects 12, 12Z.

Broadcast, Multicast and Any-Casts

With certain applications, such as machine learning or artificial intelligence, it is common for a transaction generated by one IP agent 14 to be widely disseminated to multiple IP agents 14 on the SoC 100. Transactions that are widely disseminated to multiple IP agents 14 can be implemented by a broadcast, a multicast, or an any-cast. On a given SoC 100, broadcasts, multicasts and/or any-casts can each be uniquely implemented or implemented together. A brief definition of each of these types of transactions are provided below.

A broadcast is a transaction that is sent to all the IP agents on the SoC 100. For example in the SoC 100 illustrated in FIG. 8, a broadcast sent by $IP_1$ will result in $IP_2$ through $IP_N$ each receiving the transaction.

A multicast is a transaction that is sent to more than one, including potentially all, of the IP agents on the SoC. For example if $IP_1$ generates a multicast transaction designating $IP_5$, $IP_5$ and $IP_9$, then these agents 14 receive the transaction, while the remainder of the IP agents 14 on the SoC 100 do not. If a multicast is sent to all of the IP agents 14, it is essentially the same as a broadcast.

A read-response multicast is a variation of the above-described multicast transaction. With a read-response multicast, a single IP agent 14 may read the contents of a memory location. Rather than just the initiating IP agent 14 receiving the contents, a multiplicity of destination IP agents 14 receive the contents. The IP agents 14 receiving the read results may range from more than one IP agent 14 to all the IP agents 14 on the SoC 100.

An any-cast is a transaction generated by an IP agent 14. The sending IP agent 14, however, does not designate any target IP agent(s) 14. Instead, the interconnect fabric 106 (i.e., one or more of the nodes 102) determines the recipient IP agent(s) 14. For example, if $IP_1$ generates an any-cast transaction, one or more of the nodes 102 determines which of the other agents $IP_2$ through $IP_N$ should receive the transaction. In various implementations of an any-cast transaction, a single, multiple or all of the IP agents 14 on the SoC may receive an any-cast transaction.

A given transaction can be initiated as a broadcast, multicast including a read-response multicast, or an any-cast in several ways. For the sake of brevity, these transactions are collectively referred to below as "BMA" transactions, meaning broadcasts, multicasts (which includes read-response multicasts), or any-cast transactions.

In one embodiment, an IP agent 14 may initiate a BMA transaction using a coded command that is inserted into the command field CMD of the header 34 of packet(s) 32 representative of the transaction. With coded commands, the interconnect fabric 106 of the SoC 100 recognizes or understands the transaction is not a regular transaction, designating one source and one destination IP agent 14, but rather is a BMA transaction. For example, unique combinations of bits can define a given transaction as either a broadcast, multicast, read-response multicast or an any-casts respectively.

In other embodiments, a BMA transaction can be implemented by issuing a read or write transaction with a BMA address defined in the ADDR field of header 34 of the packet(s) 32 representative of the transaction. The BMA address is designated within the SoC 100 system as signifying one of a broadcast, multi-cast or any-cast transaction. As a result, the BMA address is recognized by the interconnect fabric 106 and the transaction is treated as a broadcast, multi-cast or an any-cast.

In yet another embodiment, both commands and a BMA address can be used to designate a broadcast, multi-cast or any-cast transaction.

An any-cast is typically used in a situation where a source IP agent 14 wishes to send a transaction to multiple destinations, but the source IP agent 14 is unaware of factors that aid in selecting one or more preferred or ideal destination IP agent(s) 14. For instance, a source IP agent 14 may wish to send a transaction to multiple IP agents that each implements an accelerator function. By designating the transaction as an any-cast, one or more of the nodes 102 is responsible for selecting the destination IP agent(s) 14. In various embodiments, the selection criteria may widely vary and may be based on congestion (IP agents that are busy versus those that are idle or not busy), a random selection function, a hardwire logic function, a hash function, a least recently used function, power consumption considerations, or any other decision function or criteria. The responsibility of selecting the destination IP agent(s) 14 is thus shifted to the node(s) 102, which may have more information to make a better routing decision than the source agent 14.

Referring to 9A, a diagram 90 illustrating logic of a node 102 to support BMA addressing is illustrated. The logic 90 includes the LUT 30, an Interconnect Fabric ID (IFID) table 124 and an optional physical link selector 126. The optional physical link selector 126 is used when there are two (or more) duplicate physical resources that share a single logical identifier, such as trunking situations, described in detail below.

The IFID table includes for each IP agent 14 (*a*) a corresponding logical IP ID for logically identifying each IP agent 14 within the SoC 100 and either (b) a port 20 if the corresponding IP agent 14 is local to the node 102 or (c) an access port 22 to the appropriate interconnect 12 or 12Z leading to a next node 102 along the delivery path to the corresponding IP agent 14. With this arrangement, each node has access to the identity of the physical port 20 and/or 22 needed for delivering a transaction to each IP agent 14 in the SoC 100.

The IFID table 124 for each node 102 in the fabric 106 is relative (i.e., unique). In other words, each IFID table 124 includes only the list of ports 20 and/or 22 needed to deliver transactions either to (1) its local IP agents 14 or (2) the shared interconnects 12, 12Z to other nodes 102 along delivery path(s) to the other IP agents 14 in the SoC not locally connected to the node 102. With this arrangement, each node 102 will either (1) deliver transactions to its local IP agent(s) 14 designated as a destination and/or (2) forward the transaction via an interconnect 12, 12Z to another node 102. At the next node, the above-described process is repeated. By either locally delivering or forwarding transactions at each node 102, eventually a given transaction will be delivered to all designated destination IP agents 14 within the interconnect fabric 106 for the SoC 100.

The LUT 30 includes a first portion 120 that is used for the routing of conventional transactions (i.e., transactions sent to a single destination IP agent 14). When a conventional transaction is generated, the source IP agent 14 defines a destination address in system memory 24 in the ADDR field of the packet header(s) representing the transaction. The transaction is then provided to the local node 102 for routing. In response, the ARL 28 accesses the first portion 120 of the LUT 30 to find the logic IP ID corresponding to the destination address. The IFID table 124 is then accessed to define either (a) a port 20 if the destination IP agent 14 is local to the node 102 or (b) an access port 22 to the appropriate interconnect 12 or 12Z leading a next node 102 along the delivery path to the destination IP agent 14. The IP ID is placed in the DST field of the header(s) 34 of the packet(s) 32 prior to being sent along the appropriate port 20 or 22.

For broadcast, multicast and any-cast transactions, the second portion 122 of the LUT 30 includes a number of BMA addresses (e.g., BMA 1 through BMA N, where N is an arbitrary number that may be selected as needed or appropriate) and corresponding information for each BMA address. In various embodiments, the corresponding information can be:

(1) One or more specific IP IDs (e.g., IP4 and $IP_7$ for BMA address 1 and $IP_5$, $IP_{12}$ and $IP_{24}$ for BMA address 2);

(2) A unique code (e.g., Code 1 and Code 2 for BMA address 10 and 11);

(3) Bit vectors (e.g., for BMA addresses 20 and 21).

Each code uniquely identifies a different set of destination IP agents. For instance, a first code can be used to designate a first set of destination IP agents (e.g., $IP_1$, $IP_{13}$ and $IP_{21}$), while a second code can be used to designate a different set of destination agents (e.g., $IP_4$, $IP_9$ and $IP_{17}$).

With bit vectors, each bit position corresponds to an IP agent 14 on the SoC 100. Depending on whether a given bit position is set or reset, the corresponding IP agent 14 is designated as either a destination or not a destination respectively. By way of example, a bit vector of (101011 . . . 1) indicates that corresponding IP agents 14 $IP_1$, $IP_3$, $IP_5$, $IP_6$ and $IP_N$ are set, while the remainder are reset).

With each of the embodiments described above, one or more logical IP IDs are identified as destination IP agents for a given transaction. The IFID table 124 is used to translate the logical identifiers IP ID values into the physical access port(s) 20 and/or 22 needed to route transactions to their destinations. In the case of BMA addresses, the unique code or bit vector may be used in place of the IP ID to determine the correct physical access port(s) 20 and/or 22 is/are needed.

Both codes and bit vectors can be used to designate a large number of destination IP agents 14. A bit vector can possibly be limited by the width of the destination field DST of the header 34 of packet(s) 32 representing the transaction. For instance if the destination field DST is 32, 64, 128 or 258 bits wide, then the maximum number of IP agents 14 is limited to 32, 64, 128 and 256 respectively. If the number of IP agents 14 on a given SoC happens to exceed the number of possible IP agents that can be identified by the width of the destination field DST, then other fields in the header 34 may possibly be used or the DST field can be expanded. With highly complex SoCs 100, however, the number of IP agents 14 may exceed the number of available bits that can practically be used in a bit vector. With codes, this problem is avoided as any number of destination IP agents may be designated.

It should be understood that the examples provided with regard to FIG. 9A are illustrative in nature and are not intended to be limiting in any manner. In actual embodiments, the number of BMA addresses that may be used in a SoC 100 may widely vary from one too many.

Source Based Routing (SBR)

Source Based Routing (SBR) differs from conventional routing in that:

(1) The source IP agent 14 has some knowledge or direction it gives to the interconnect fabric 106 when issuing a transaction. For instance, the source IP agent 14 knows the IP IDs of the destination IP agent(s) 14 it wishes to send a transaction;

(2) The source IP agent 14 does not care and/or know about an address in system memory 24 normally provided in the ADDR field of packet header(s) 34 of the packet(s) 32 of the transaction; and (3) The nodes 102 in the interconnect fabric 106 know to do something different than simply translating an address in the ADDR field of the header(s) 34 of packets into a single IP ID for the single destination IP agent.

Broadcasts and multicasts are both examples of transactions that can possibly, but not always, be SBR transactions. When a source issues a broadcast or multicast that designates in the header(s) 34 of the packet(s) 32 of the transaction either (a) a broadcast and/or multicast code and (b) designates destination IP agents 14, then the transaction is considered source-based because the source IP agent is designating the destination IP agents. On the other hand, when a source initiates a broadcast or multicast transaction using a BMA address without any specific knowledge of the destinations, then the transaction is considered non-source based. Since any-cast transactions do not define destination IP agents 14, they are not considered source-based.

Hashing

With hashing, a hash function is used to define a destination or a route to a destination. In certain implementations, a hashing function may define multiple destinations and/or multiple routes to multiple destinations respectfully.

Figure 9B:
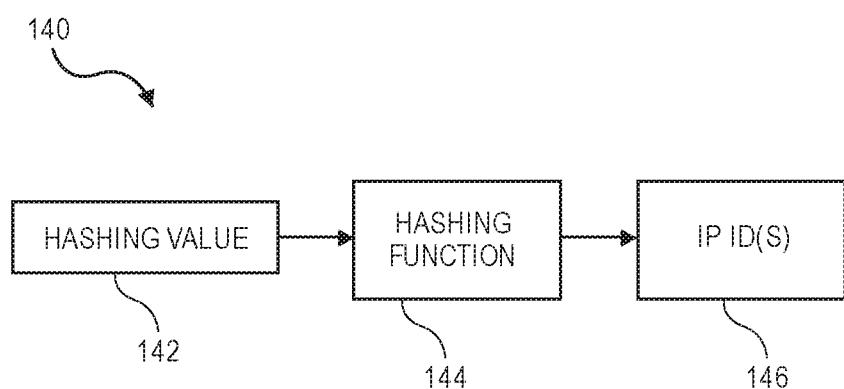
FIG. 9B illustrates a hashing function that may be used in accordance with a non-exclusive embodiment of the invention.

Referring to FIG. 9B, a diagram 140 illustrating the use of a hashing function for implementing routing decisions is illustrated. In this embodiment, a hashing value 142 is provided in any number of fields of the header 34 of the packet(s) 32 representing a transaction. For example, a sub-set of the address bits, the command, the source agent ID, or any possible combination of information or data contained in the header(s) 34 may be used to define the hashing value. Within the corresponding local node 102 or elsewhere on the SoC 100, a hashing function 144 is applied to the hashing value 142. In response to the hash function 144, a routing decision can be made. For instance, one or more IP IDs of destination agents 14 may be defined. By providing different hashing values, different routing decisions may be defined. It should be understood that hashing may be used for many other applications within the SoC. One such application is the use of a hashing function for trunking. With trunking, there are two (or more) duplicate physical resources that share a single logical identifier. As described in more detail below, a hashing function can be used to select among the duplicate physical resources.

Optimizing Transaction Traffic

Certain applications for SoCs, such as machine learning, artificial intelligence, data centers, etc., can be transaction intensive. These types of applications tend to rely on broadcasts, multicasts and any-cast, which can further increase transaction traffic.

Broadcast transactions can significantly increase the volume of traffic sent over the interconnect fabric 106.

To reduce the occurrence of bottlenecks, a number of procedures are proposed that reduce transactions traffic. Such procedures include (1) expanding transactions and consolidating responses at nodes 102 of an interconnect fabric 106 of an SoC 100 (2) intra-stream interleaving of two or more transactions over streams defined by paired virtual channel-transaction class combinations respectively, (3) and "trunking" two or more physical links between IP agents sharing a common logical link or two or more identical IP agents sharing a common logical address.

Expanding Transactions and Consolidating Responses

Broadcasting, multicasting, read-response multicasting and any-casting can each significantly increase the amount of transaction traffic between IP agents 14 on the SoC 100.

If an SoC 100 has 25 IP agents and one of them generates a broadcast transaction, then up to twenty-four (24) individual transactions are typically sent over the interconnect fabric 106 to the other IP agents 14. Non-posted (NP) transactions require a response in the form of a completion (C) transaction. If the transaction broadcast to the twenty-four IP agents is non-posted, then another twenty-four completion (C) transactions will be generated as well. As illustrated in this simple example, a broadcast can rapidly escalate the volume of traffic transmitted over the interconnect fabric 106.

Multicast and any-cast transactions can also rapidly expand the volume of traffic. With each of these transaction types, multiple recipients may be designated, which means multiple transactions are sent and possibly multiple completion response transactions are received over the interconnect fabric 106. Also with read-response multicast transactions, the read contents can be sent to multiple destination IP agents 14. As a result, the transaction volume can significantly increase with these types of transactions as well.

To more efficiently operate the interconnect fabric 106, techniques of expanding and consolidating transactions at nodes 102 are used to reduce the amount of traffic.

Figure 10A:
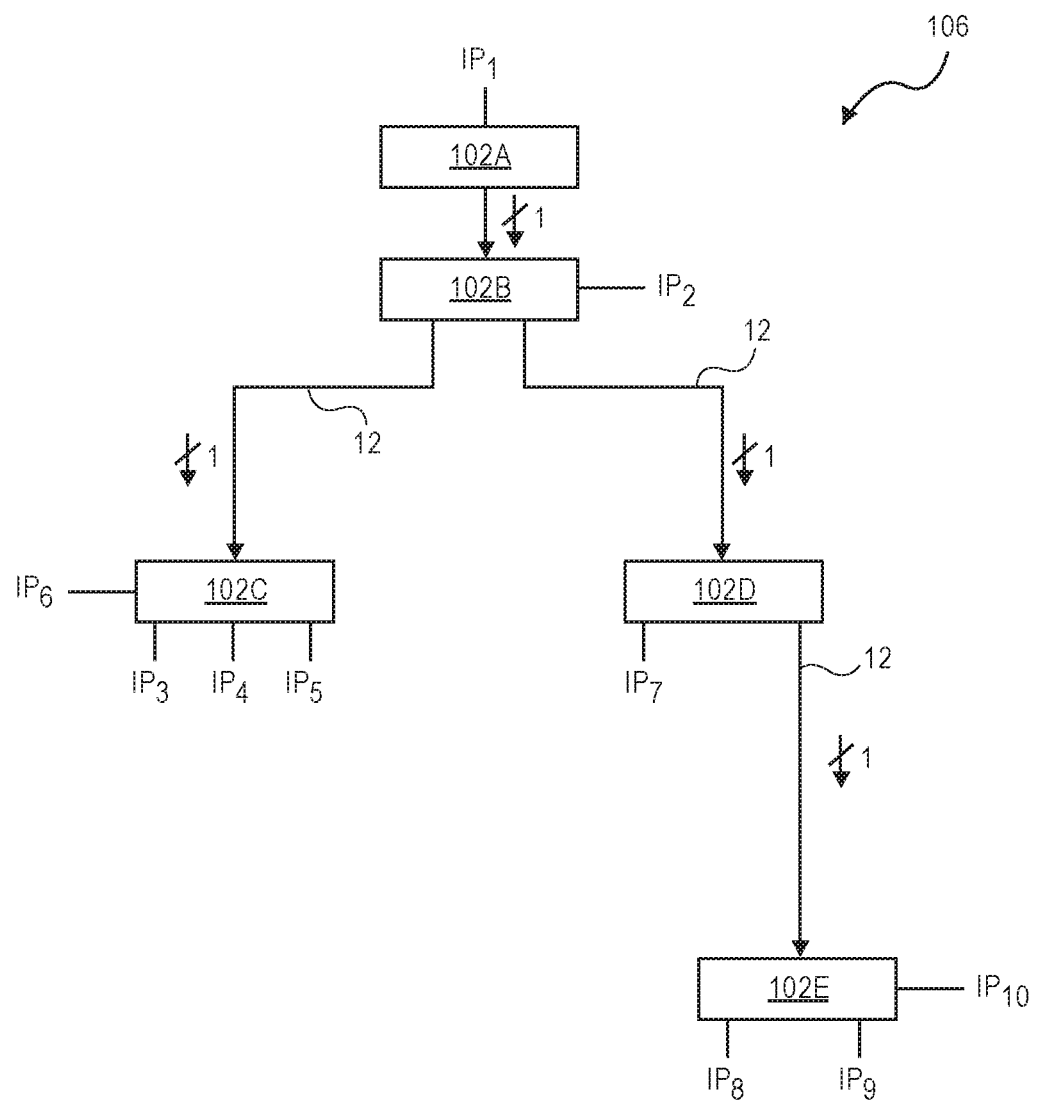
FIG. 10A and FIG. 10B illustrate the expanding and consolidating of transactions sent over an inter-connect fabric of a SoC in accordance with non-exclusive embodiments of the invention.
Figure 10B:
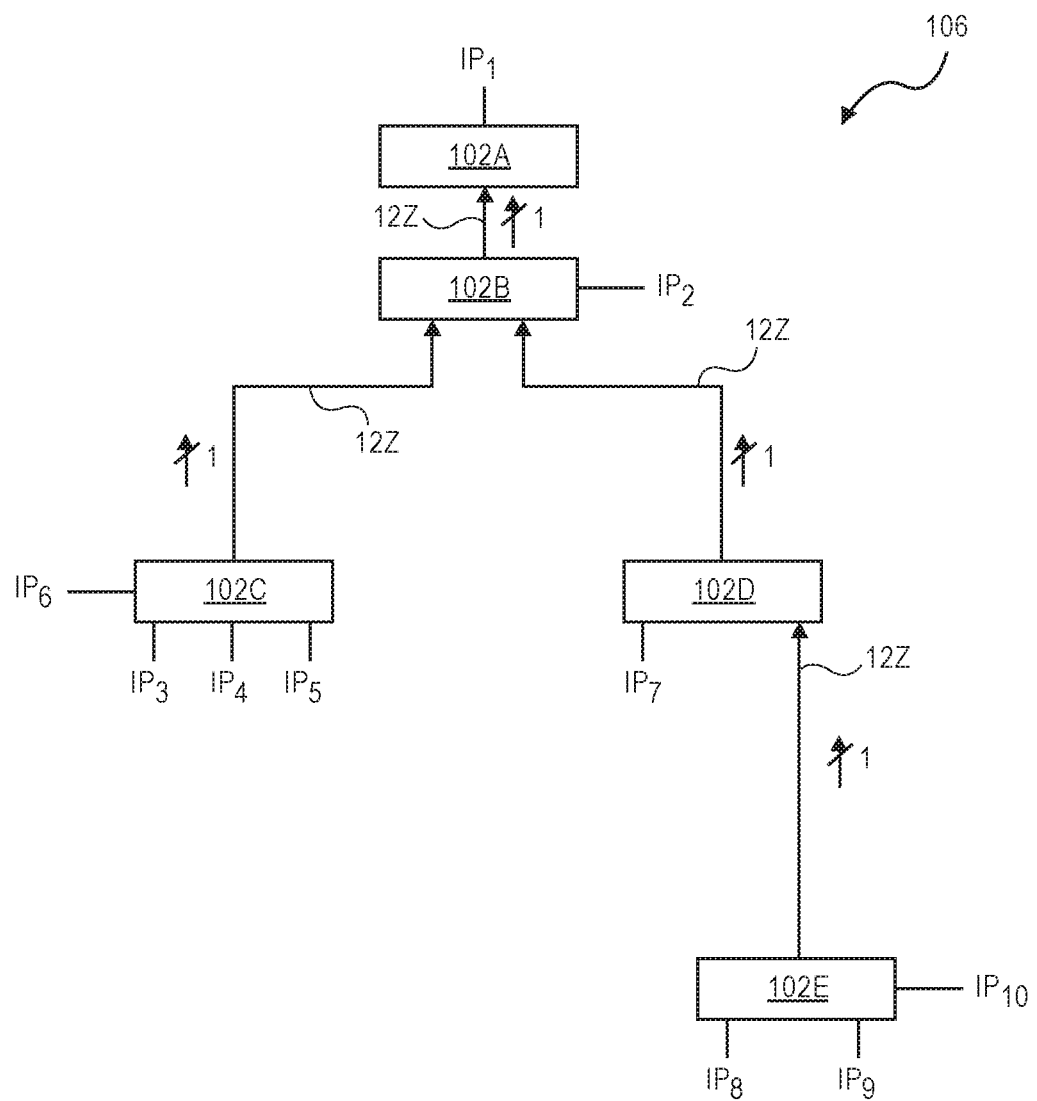

Referring to FIGS. 10A and 10B, a diagram illustrating an exemplary SoC is illustrated. In this example, the SoC includes an interconnect fabric 106 that includes five interconnected nodes 102A-102E and ten IP agents 14 ($IP_1$ through $IP_{10}$).

With reference to FIG. 10A, $IP_1$ broadcasts a non-posted write transaction to the other IP agents $IP_2$ through $IP_{10}$. By employing expanding, only a single transaction is sent down each shared interconnect 12. At each down-stream node 102B-102E, the node (1) provides the transaction to any local IP agents 14 and (2) forwards the transaction to any down-stream nodes 102. Thus, in this example:
  Node 102B provides the transaction to $IP_2$ and forwards a single instantiation of the transaction to nodes 102C and 102D respectively;
  At node 102C, the transaction is provided to local agents $IP_3$, $IP_4$ and $IP_5$;
  Node 102D provides the transaction to $IP_7$. In addition, node 102D also forwards a single instantiation of transaction to node 102E; and
  At node 102E, the transaction is provided to $IP_8$, $IP_9$ and $IP_{10}$.

With the above example, only a single transaction is sent down each shared interconnect 12, regardless of the number of IP agents 1 that are down-stream from the originating IP agent 14.

With reference to FIG. 10B, the consolidation of response transactions is explained. Since the broadcast transaction was a non-posted write, each destination agent $IP_2$ through $IP_{10}$ is required to return a completion transaction. With consolidation, each node 102B through 102E consolidates the completion transaction received from its local IP agents 14 and then sends only a single completion transaction upstream toward the node 102A. In other words:
  Node 102E consolidates the completion transactions received from $IP_8$ through $IP_{10}$ and returns a single completion transaction to node 102D;
  At node 102D, the completion transactions received from $IP_7$ and node 102E are consolidated and one completion transaction is returned to node 102B;
  Similarly, node 102C returns a single consolidated transaction for $IP_3$, $IP_4$ and $IP_5$; and
  Finally, node 102B consolidates the completion transactions received from nodes 102C, 102D and $IP_2$ returns a single completion transaction to node 102A and $IP_1$.

The above example illustrates the efficiency of expanding and consolidating. Without expanding, nine (9) separate transactions, one for each of the agents $IP_2$ through $IP_{10}$, would have to be transmitted over the interconnect fabric 106. By using expanding however, the number of transmitted transactions over the various shared interconnects 12 is reduced to four (4). A total of nine (9) completion transactions are also consolidated into four (4).

On occasion, it is possible for errors to occur and a completion transaction is not generated by one or more of the receiving IP agents $IP_2$ through $IP_{10}$. Errors can be handled in a number of different ways. For example, just successful completions can be consolidated, while erroneous response(s) can be either combined and/or separately sent. In yet another alternative, both successful and erroneous completions can be consolidated, but each is flagged to indicate either a successful or unsuccessful response.

Although the above description is provided in the context of a broadcast, it should be understood that expansion and consolidation of transactions can also be implemented with multicasting, read-response multicasting and/or any-casting.

In transaction-intensive applications such as machine learning, artificial intelligence, data centers, etc. where broadcasts, multicast, and any-cast transactions are common, the ability to expand and consolidate transactions can significantly reduce the amount the transaction traffic over the interconnect fabric 106, eliminating or reducing bottlenecks and increasing system efficiency and performance.

Trunking

An interconnect fabric 106 of an SoC 100 typically includes, for each direction, a single, physical link between (a) an IP agent 14 and a local node 102 and (b) between nodes 102. When there is only a single link, there is a one-to-one correspondence between the physical link and the access port 20 or 22 for that physical link. Similarly, with most interconnect fabrics 106, there is also a one-to-one correspondence between a physical IP agent 14 and the logical IP ID used to access that IP agent 14.

In high performance applications, it may be advantageous to use a technique called trunking. With trunking, there are two (or more) duplicate physical resources that share a single logical identifier. By duplicating physical resources, bottlenecks can be avoided and system efficiency and performance can be improved. For instance, if one physical resource is busy, powered down, or is unavailable, then one of the duplicate resources can be used. Trunking can also improve reliability. If one physical resource, such as an interconnect or an IP agent for instance goes down, becomes unavailable or cannot be used for whatever reason, then the other physical resource can be use. By addressing the duplicate resources using the same logical identifier, the advantages of duplicate physical resources can be realized without having to change the logical addressing system used on the SoC 100. The challenge, however, is selecting and keeping track of which if the duplicate physical resources is used.

Figure 11A:
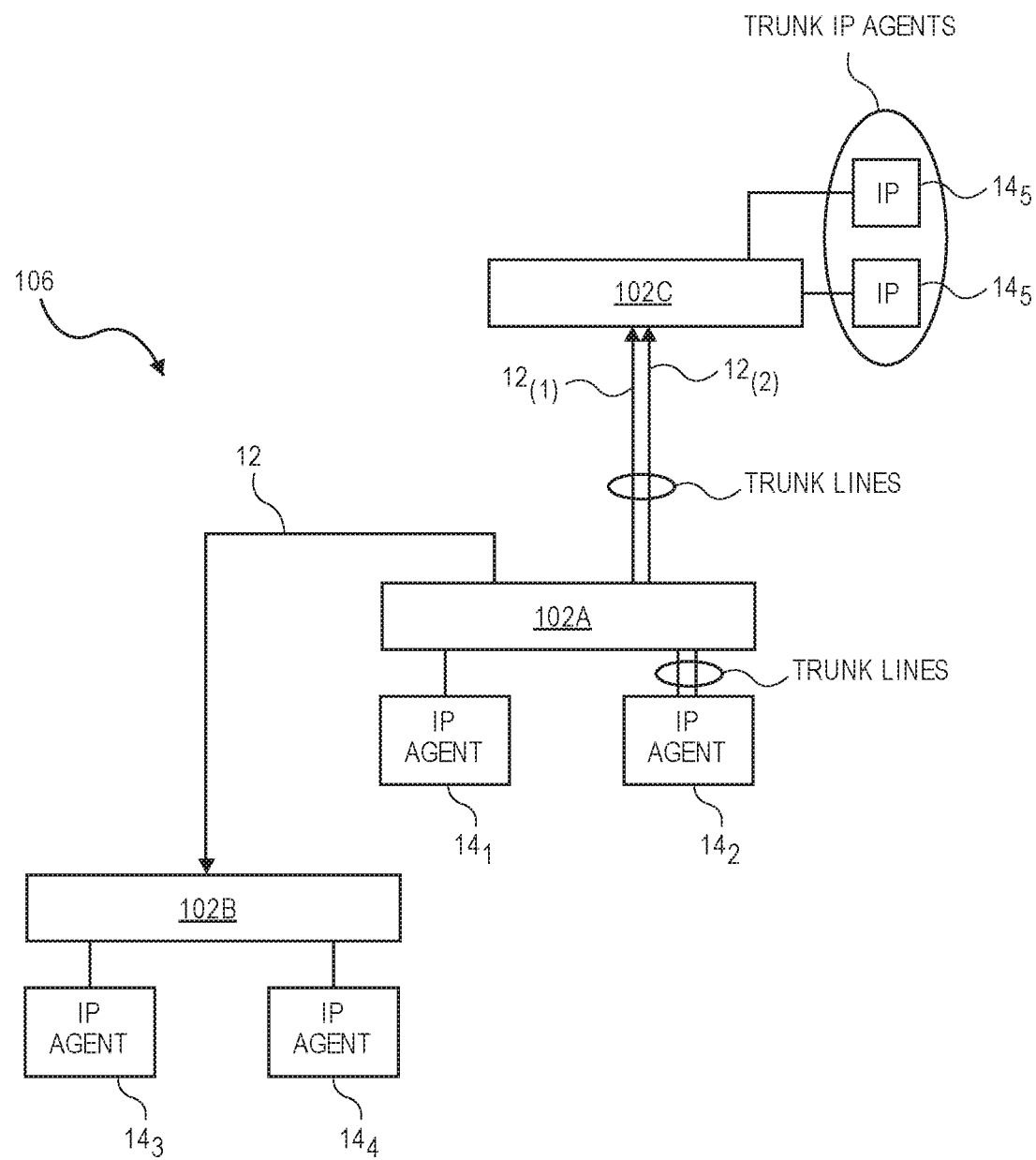
FIG. 11A and FIG. 11B illustrate trunking links and the selection of a physical link among the trunking links in accordance with a non-exclusive embodiment of the invention.

Referring to FIG. 11A, an interconnect fabric 106 of a SoC 100 including several examples of trunking is illustrated. In this example, the interconnect fabric 106 includes three nodes 102A, 102B and 102C. Node 102A includes two IP agents $14_1$ and $14_2$. Node 102B includes two IP agents $14_3$ and $14_4$. Node 102C includes a single IP agent $14_5$. The interconnect fabric 106 includes the following trunking examples:
  A pair of physical "trunk" lines between the node 102A and the IP agent $14_2$;
  A pair of same-direction physical "trunk" interconnects $12_{(1)}$ and $12_{(2)}$ from node 102A to 102C; and
  A pair of identical IP agents $14_5$.

With each of these examples there is no one-to-one correspondence between a logical identifier and the physical resource. On the contrary since there are two physical resources available, a selection needs to be made on which physical resource to use.

Figure 11B:
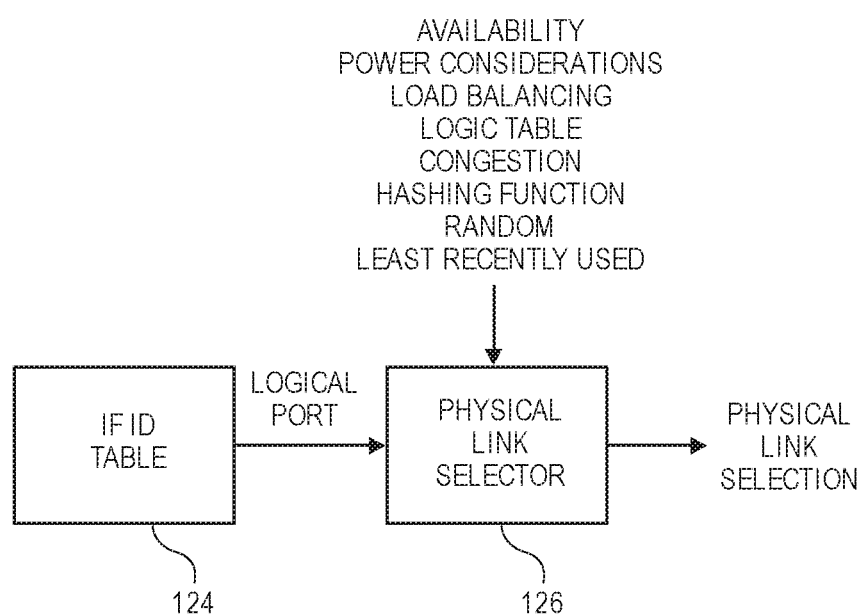

Referring to FIG. 11B, a diagram illustrating the optional physical link selector 126 (of FIG. 9A) is illustrated. As noted above, there are two (or more) duplicate physical resources that share a single logical identifier with trunking. Whenever the IFID table 124 identifies a logical IP ID having duplicate physical resources, such as in trunking situations, the optional physical link selector 126 is used to make the selection. The physical link selector 126 may make its selection using one or more decision factors, such as the availability (or lack thereof) of the physical resources, congestion, load balancing, a hashing function, a random selection, a least recently used selection, power considerations, etc. For instance if one physical resource is busy, congested, and/or unavailable, then the other would be selected. Alternatively, if one resource is powered down to reduce power consumption, the other may be selected. Regardless of how made, the selection results in identification of a physical port 20 or 22 that is used to access the selected physical resource.

In a non-exclusive embodiment, the selection of a physical resource is preferably used until an operation is complete. If a series of related transactions are sent between a source IP agent 14 and a duplicate pair of destination IP agents (e.g., the two IP agents $IP_5$ of FIG. 11A), then all the transactions are sent to the same destination IP agent until the operation is complete. Otherwise data corruption or other issues may occur. A similar approach is typically preferred when the duplicate physical resource is an interconnect. With transactions that require a response, such as a read, then both the read request transaction and the result response should preferably be sent over the same interconnect. Furthermore, an entire transaction, and the packets of transactions, should preferably be routed over the same path, to the same destination, to prevent corruption of the packets of the transaction. Since packets can take several beats to get through links, and possibly be interleaved with other virtual channels, it's important to keep the port or link constant until the end of the packet. Otherwise, the multiple beats of a packet can become out of order as portions of the packets moves through the system, which may corrupt the information. It is usually advisable to route the response via the same path as the request but it is not required.

In certain non-exclusive embodiments, it may be advantageous to provide destination IP agents with a capability of reordering the beats of transactions that are received out of order, or from different sources, using ordering information sent with along each beat. For example, the control bits M may be used to specify a unique "beat count number" for each beat of a packet. The beats of the packet can then be assembled by the destination IP agent in their correct numerical order using the unique beat count number information sent along with each beat. By providing a beat count number that is sent along with each beat, many of the above-described issues with corruption may be resolved.

Intra-Stream Interleaving

As previously noted, a stream is defined as the pairing of a virtual channel and a transaction class. With four (4) virtual channels (e.g., VC0, VC1, VC2 and VC3) and three (3) transaction classes (P, NP, C), there are a maximum of twelve (12) different possible streams. The twelve streams are entirely independent. Since the streams are independent, they can be interleaved over a shared resource, such as the interconnect wires 12 and 12Z for example. At each arbitration step, a stream of a virtual channel is selected and the corresponding port 22 is locked to that transaction for the remainder of that transaction. A different virtual channel can also be selected and interleaved over the same port prior to completion of the transmission of the transaction, but another stream of the same virtual channel cannot be selected until the transaction is complete.

Intra-stream interleaving is the interleaving of two or more transactions sharing the same stream, provided the two transactions are independent of one another. Examples of independent transactions include (1) two different IP agents 14 generating transactions sharing the same stream and (2) the same IP agent 14 generating two transactions sharing the same stream, but the generating IP agent 14 marks the two transactions as independent. By marking the transactions as independent, it signifies that the transactions can be re-ordered and delivered in an interleaved fashion. With intra-stream interleaving, the above-described restriction of locking a stream of a virtual channel to a port until the transaction is complete can be relaxed or eliminated. With intra-stream interleaving, (1) two or more independent transactions can be interleaved over the stream and (2) and different streams associated with the same virtual channel can also be interleaved.

With intra-stream interleaving, additional information is required to indicate the two (or more) independent transactions that may be interleaved over the same stream. In various embodiments, this may be accomplished in a number of different ways. In one embodiment, the header(s) 34 of the packets of independent transactions are assigned a unique transaction identifier or ID. By using unique transaction identifiers, each beat of each transaction can be flagged as independent. By using a unique transaction ID for each transaction, the various nodes 102 keep track of the beats of multiple independent transactions that are interleaved over the same stream.

For a given pair of interleaved transactions, the bits designating the virtual channel and the transaction class will be the same, but the bits signifying the transaction IDs for each will be different.

The additional transaction ID information included in the control bits M thus allow both source and destination IP agents 14, as well as the interconnect fabric 106, to recognize or distinguish one transaction versus the other when interleaved over the same stream.

Synchronous Vs. Asynchronous Delivery

With broadcasting, multicasting, read-response multicasting, and any-casting, multiple instantiations of the same transaction may be transmitted across the interconnect fabric 106. If each of the targeted destinations and the paths to those destinations are available, then each destination IP agent 14 will receive the transaction in due course, delayed only by normal latency on the network. On the other hand if any of the paths or destinations are unavailable (e.g., a resource buffer is full), then available destination(s) may receive the transaction before the unavailable destination(s). The disparate arrival times under such circumstances raises two different implementation possibilities.

In a first synchronous or "blocking" embodiment, effort is made to assure that each destination receives the transaction at approximately the same time. In other words, the delivery of the transaction may be delayed or "blocked" to otherwise available resources until non-available resources become available. As a result, the receipt of the transaction by each the designated recipients is synchronized. This embodiment may be used in applications where it is important for destinations to receive transactions at approximately the same time.

In a second asynchronous or non-blocking embodiment, no blocking effort is made to delay the delivery of a transaction to available destinations. Instead, each instantiation of the transaction is delivered based on availability, meaning available resources receive the transaction immediately while unavailable resources receive the transaction as they become available. As a result, delivery may occur asynchronously or at different times. The advantage of this approach is that available destination IP agents 14 can process transactions immediately and are not blocked waiting to be synchronized with other IP agents. As a result, delays are avoided.

Although only a few embodiments have been described in detail, it should be appreciated that the present application may be implemented in many other forms without departing from the spirit or scope of the disclosure provided herein. Therefore, the present embodiments should be considered illustrative and not restrictive and is not to be limited to the details given herein, but may be modified within the scope and equivalents of the appended claims.

What is claimed is:

1. A System on a Chip (SoC), comprising:
   an interconnect fabric including a plurality of nodes and shared interconnects between the plurality of nodes;
   a plurality of agents, each of the plurality of agents connected to at least one node among the plurality of nodes of the interconnect fabric; and
   a plurality of arbitration elements provided at the plurality of nodes of the interconnect fabric respectively,
   the plurality of arbitration elements acting to arbitrate transactional traffic transmitted between the plurality of agents across the interconnect fabric, the plurality of arbitration elements configured as needed, on a clock cycle-by-clock cycle basis, to:
   (1) perform an arbitration among competing portions of multiple transactions;
   (2) select a winning portion among the competing portions of the multiple transactions; and
   (3) transmit the winning portion over a select shared interconnect along a delivery path to a destination, the transmission of the winning portion occurring over one of a multiplicity of streams, each of the multiplicity of streams defined by a unique combination of one of multiple virtual channels and one of multiple transaction classes,
   wherein the arbitration elements are further configured to interleave the transmission of the winning portions of the multiple transactions over the multiplicity of streams associated with the shared interconnects of the interconnect fabric;
   wherein the winning portions of transactions having multiple portions are always transmitted over the same stream; and
   the transactions having multiple portions each include a unique transaction identifier that uniquely identifies the transactions within the interconnect fabric respectively, the unique transaction identifiers used to assemble the multiple portions of the transactions into complete transactions at their destinations respectively.

2. The SoC of claim 1, wherein each of the multiplicity of streams is logically independent.

3. The SoC of claim 1, wherein at least one of the arbitration elements further comprises:
   a plurality of source ports; and
   a multiplicity of buffers for each of the plurality of source ports.

4. The SoC of claim 3, wherein the multiplicity of buffers for each of the plurality of source ports are provided for each of the multiplicity of streams respectively.

5. The SoC of claim 3, wherein the at least one arbitration element performs its arbitrations among the plurality of source ports.

6. The SoC of claim 1, wherein at least one arbitration element performs its arbitrations among the multiplicity of virtual channels.

7. The SoC of claim 1, wherein at least one arbitration element performs its arbitrations among the multiple trans action classes.

8. The SoC of claim 1, wherein at least one arbitration element uses Device ordering rules when performing its arbitrations.

9. The SoC of claim 1, wherein at least one arbitration element uses Peripheral Component Interconnect (PCI) order rules when performing its arbitrations.

10. The SoC of claim 1, wherein the transaction classes include one or more of the following:
    a Posted transaction class that requires no response;
    a Non-Posted transaction class that requires a response from an accessed source; and
    a Completion transaction class for responses to Non-Posted transactions.

11. The SoC of claim 3, wherein the at least one arbitration element selects the winning portion, on the clock cycle-by-clock cycle basis, by performing its arbitrations among:
    (1) the plurality of source ports;
    (2) the multiple virtual channels; and
    (3) the multiple transaction classes.

12. The SoC of claim 11, wherein the arbitrations among the plurality of source points, the multiple virtual channels and the multiple transaction classes are performed in any order.

13. The SoC of claim 1, wherein the arbitration excludes select portions, among the multiplicity of transactions, defining destinations that are not available.

14. The SoC of claim 1, wherein the arbitration excludes select portions, among the multiplicity of transactions, associated with one or more of the multiple virtual channels that is/are not available.

15. The SoC of claim 1, wherein the plurality of arbitration elements are further configured to repeatedly perform (1) through (3) so that a plurality of winning portions are transmitted over the multiplicity of streams.

16. The SoC of claim 1, wherein an amount of data transferred each clock cycle is at least partially dependent on a bit-width of each of the shared interconnects of the interconnect fabric respectively.

17. The SoC of claim 1, further comprising a plurality of ports associated with a select agent, each of the plurality of ports including multiple buffers corresponding to the multiple virtual channels associated with the shared interconnect respectively.

18. The SoC of claim 17, wherein the multiple buffers of a given port are provided to buffer the portions of transactions generated by the corresponding agent.

19. The SoC of claim 1, wherein at least one of the arbitration element selects winning portions by:
    performing a first level arbitration to a select a winning virtual channel among the multiplicity of virtual channels; and performing a second level arbitration to select the winning portion among competing portions of transactions, each of the competing portions of transactions assigned to the winning virtual channel selected by the first level arbitration.

20. The SoC of claim 19, wherein Device order arbitration rules are used.

21. The SoC of claim 19, wherein Peripheral Component Interconnect (PCI) order arbitration rules are used.

22. The SoC of claim 19, wherein the first level arbitration is performed among only virtual channels that are available.

23. The SoC of claim 19, wherein the first level arbitration is performed only among the competing portions of the transactions defining destinations that are available to process the competing transactions respectively.

24. The SoC of claim 1, wherein the arbitration is performed using an absolute arbitration scheme where one of the multiple virtual channels is given absolute priority over other virtual channel(s).

25. The SoC of claim 1, wherein the arbitration is performed among the multiple virtual channels using a round-robin priority scheme.

26. The SoC of claim 1, wherein the arbitration is performed among the multiple virtual channels using a least recently serviced protocol.

27. The SoC of claim 1, wherein the arbitration is performed among the multiple virtual channels using a weighted percentage assigned to each of the multiplicity of virtual channels respectively.

28. The SoC of claim 1, wherein the agents each perform a defined function.

29. The SoC of claim 1, wherein the portions of the multiple transactions are packets or portions of packets respectively.

30. The SoC of claim 1, wherein the one or more portions of each of the multiple transactions is represented by one or more packets respectively.

31. The SoC of claim 1, wherein each of the multiple transactions is represented by at least one packet, the at least one packet including one of the following:
 (a) a source field for a source identifier;
 (b) a destination field for a destination identifier;
 (c) a payload field for defining a size of any payload associated with the packet;
 (d) an address field for defining an address in system memory space associated with a destination; and
 (e) a transaction identifier field for containing the unique transaction identifier; or
 (f) any combination of (a) through (e).

32. The SoC of claim 1, wherein each of the plurality of nodes operates in cooperation with at least one switch, the switch including one or more access ports defining one or more points of ingress/egress onto the interconnect fabric for one or more of the plurality of agents respectively.

33. The SoC of claim 1, further comprising a plurality of ports associated with the plurality of agents respectively, each of the ports having a unique port identifier that is used for accessing an associated agent respectively.

34. The SoC of claim 1, wherein the plurality of arbitration elements operate in cooperation with address resolution logic, the address resolution logic arranged to:
 identify an address contained in the winning portions of transactions, the address identifying a location in system memory;
 for each identified address, ascertain an access port associated with from the destination for the transactions respectively; and
 insert an access port ID corresponding to the ascertained access port into at least one packet associated with the winning portions of the transactions respectively,
 wherein the insertion of the access port ID enabling the winning portions of transactions to be delivered to their destination over one or more of the shared interconnects of the interconnect fabric respectively.

35. The SoC of claim 1, wherein the transaction classes include:
 Non-posted where a response from a destination is required;
 Posted where no response from the destination is required; or
 Completion which is generated in response to a non-posted transaction.

36. The SoC of claim 1, wherein the shared interconnects are one-directional.

37. The SoC of claim 1, wherein the shared interconnects are N data bits wide.

38. The SoC of claim 1, wherein the shared interconnects include M control bits.

39. The SoC of claim 1, wherein the multiplicity of virtual channels includes any number from one (1) virtual channel to thirty two (32) virtual channels.

40. The SoC of claim 1, wherein the shared interconnects between any two nodes include a first interconnect for transmitting transactional traffic in a first direction and a second shared interconnect for transmitting transactional traffic in a second direction that is opposite the first direction between the two nodes.

41. The SoC of claim 1, wherein the arbitration elements are further configured to interleave the transmission of portions of two or more independent transactions over the same stream.

42. The SoC of claim 1, wherein the arbitration elements are further configured to interleave the transmission of the portions of two or more transactions over the same stream, provided the two or more transactions are independent.

43. The SoC of claim 1, wherein the arbitration elements are further configured to interleave streams of different transactions sharing the same virtual channel.

44. The SoC of claim 1, wherein the arbitration elements are further configured to interleave the transmission of portions of different transactions over different streams.

45. The SoC of claim 1, wherein the arbitration elements are further configured to interleave the transmission of the portions of different transactions over different virtual channels.

46. The SoC of claim 1, wherein the multiple portions of a given transaction are packets, each of the packets having a packet header that includes the unique transaction identifier for identifying the transactions respectively.

47. The SoC of claim 46, wherein the multiple portions of a given transaction are packets, each packet including a packet number that is used to order the packets when assembled at a destination for the given packet.

48. The SoC of claim 1, wherein the shared interconnects include M control bits, the M control bits used to carry the unique transaction identifier for identifying the transactions respectively.

* * * * *